United States Patent
Singh et al.

(10) Patent No.: US 11,447,425 B2
(45) Date of Patent: Sep. 20, 2022

(54) METHOD FOR DESIGNING LOW PORTLAND LIQUID CEMENT WITH LONG SHELF LIFE

(71) Applicant: Halliburton Energy Services, Inc., Houston, TX (US)

(72) Inventors: John Paul Bir Singh, Kingwood, TX (US); Siva Rama Krishna Jandhyala, The Woodlands, TX (US); Thomas Jason Pisklak, Cypress, TX (US); Claudia Carmen Pineda, Humble, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 160 days.

(21) Appl. No.: 16/923,864

(22) Filed: Jul. 8, 2020

(65) Prior Publication Data
US 2022/0009847 A1    Jan. 13, 2022

(51) Int. Cl.
*C04B 40/06* (2006.01)
*C09K 8/467* (2006.01)
(Continued)

(52) U.S. Cl.
CPC ............ *C04B 40/0658* (2013.01); *C04B 7/26* (2013.01); *C04B 7/28* (2013.01); *C04B 28/04* (2013.01);
(Continued)

(58) Field of Classification Search
CPC .. C04B 28/04; C04B 7/12; C04B 7/26; C04B 7/28; C04B 28/18; C04B 2103/10;
(Continued)

(56) References Cited

U.S. PATENT DOCUMENTS 5,547,506 A * 8/1996 Rae ..................... C04B 40/0658
106/726
5,570,743 A * 11/1996 Padgett .................. B28C 9/004
166/295
(Continued)

FOREIGN PATENT DOCUMENTS

EP          0741679        3/2000
WO      2016-057045       4/2016
(Continued)

OTHER PUBLICATIONS

International Search Report and Written Opinion for Application No. PCT/US2020/042549, dated Apr. 1, 2021.
(Continued)

*Primary Examiner* — Crystal J. Lee
(74) *Attorney, Agent, or Firm* — Thomas Rooney; C. Tumey Law Group PLLC

(57) ABSTRACT

A method may include: defining engineering parameter of a proposed cement slurry, the engineering parameters comprising at least a compressive strength requirement, a density requirement, a storage time requirement, and a thickening time requirement; selecting, based at least in part on a model of compressive strength, a model of storage time, and the density requirement, at least a cement and mass fraction thereof, at least one supplementary cementitious material and mass fraction thereof, and a water and mass fraction thereof, such that a cement slurry formed from the cement, the at least one supplementary cementitious material, and the water meets the compressive strength requirement and the density requirement; selecting, based at least in part on a model of thickening time, an accelerator and mass fraction thereof; selecting, based at least in part on a model of activator thickening time, an activator and mass fraction thereof; and preparing a cement slurry comprising the cement and mass fraction thereof, the at least one supple- (Continued)

mentary cementitious material and mass fraction thereof, the water and mass fraction thereof, and the cement retarder and mass fraction thereof.

20 Claims, 11 Drawing Sheets

(51) Int. Cl.
| | | |
|---|---|---|
| *C04B 7/26* | (2006.01) | |
| *C04B 7/28* | (2006.01) | |
| *C04B 28/06* | (2006.01) | |
| *C04B 28/14* | (2006.01) | |
| *C04B 28/04* | (2006.01) | |
| *C04B 111/00* | (2006.01) | |

(52) U.S. Cl.
CPC .............. *C04B 28/06* (2013.01); *C04B 28/14* (2013.01); *C09K 8/467* (2013.01); *C04B 2111/00086* (2013.01); *C04B 2201/52* (2013.01)

(58) Field of Classification Search
CPC ...... C04B 2103/22; C04B 2111/00086; C09K 8/467; E21B 33/1272
See application file for complete search history.

(56) References Cited

U.S. PATENT DOCUMENTS

| | | |
|---|---|---|
| 6,907,929 B2 | 6/2005 | Leroy-Delage et al. |
| 7,631,692 B2 | 12/2009 | Roddy et al. |
| 8,333,240 B2 | 12/2012 | Roddy et al. |
| 8,609,595 B2 | 12/2013 | Morgan et al. |
| 8,851,173 B2 | 10/2014 | Brothers et al. |
| 8,997,578 B2 | 4/2015 | Morgan et al. |
| 9,650,560 B2 | 5/2017 | Muthusamy et al. |
| 10,047,270 B2 | 8/2018 | Pisklak et al. |
| 11,078,400 B2 | 8/2021 | Pisklak et al. |
| 11,174,198 B2 | 11/2021 | Morgan et al. |
| 11,198,649 B2 | 12/2021 | Singh et al. |
| 11,225,595 B2 | 1/2022 | Jimenez et al. |
| 2003/0217847 A1 | 11/2003 | Reddy et al. |
| 2005/0166803 A1 | 8/2005 | Dillenbeck et al. |
| 2010/0212892 A1* | 8/2010 | Santra .................... C09K 8/467 166/250.14 |
| 2017/0096874 A1* | 4/2017 | Parsons .................. G06F 30/20 |
| 2017/0364607 A1* | 12/2017 | Kaushik ................... C09K 8/00 |
| 2019/0026167 A1 | 1/2019 | Gerweck et al. |
| 2019/0026168 A1 | 1/2019 | Qiu et al. |
| 2019/0026171 A1 | 1/2019 | Lea et al. |
| 2019/0026172 A1 | 1/2019 | Wu et al. |
| 2019/0026175 A1 | 1/2019 | Shelke et al. |
| 2019/0026176 A1 | 1/2019 | Ganapathy et al. |
| 2019/0026177 A1 | 1/2019 | Damron et al. |
| 2019/0026179 A1 | 1/2019 | Araki et al. |
| 2019/0026180 A1 | 1/2019 | Wong et al. |
| 2019/0330513 A1 | 10/2019 | Jimenez et al. |
| 2019/0358853 A1 | 11/2019 | Morgan et al. |
| 2019/0367796 A1 | 12/2019 | Pisklak et al. |
| 2019/0367797 A1 | 12/2019 | Morgan et al. |
| 2020/0332172 A1 | 10/2020 | Pisklak et al. |
| 2020/0332643 A1 | 10/2020 | Pisklak et al. |
| 2020/0333318 A1 | 10/2020 | Benkley et al. |
| 2021/0147305 A1 | 5/2021 | Singh et al. |
| 2021/0147742 A1 | 5/2021 | Pearl et al. |
| 2021/0171405 A1 | 6/2021 | Singh et al. |
| 2021/0171406 A1 | 6/2021 | Singh et al. |
| 2021/0171407 A1 | 6/2021 | Singh et al. |
| 2021/0172280 A1 | 6/2021 | Singh et al. |

FOREIGN PATENT DOCUMENTS

| | | | |
|---|---|---|---|
| WO | 20180156114 | 8/2018 | |
| WO | 20180156116 | 8/2018 | |
| WO | 20180156124 | 8/2018 | |
| WO | WO-2018156123 A1 * | 8/2018 | ............ C04B 18/08 |

OTHER PUBLICATIONS

Umeokafor, C. V., & Joel, O. F. (2010). Modeling of Cement Thickening Time at High Temperatures With Different Retarder Concentrations. Nigeria Annual International Conference and Exhibition.
U.S. Appl. No. 16/923,752, filed Jul. 8, 2020.
U.S. Appl. No. 16/923,797, filed Jul. 8, 2020.
U.S. Appl. No. 16/923,829, filed Jul. 8, 2020.
U.S. Appl. No. 16/923,897, filed Jul. 8, 2020.

* cited by examiner

METHOD FOR DESIGNING LOW PORTLAND LIQUID CEMENT WITH LONG SHELF LIFE

BACKGROUND

Embodiments relate to subterranean cementing operations and, in certain embodiments, to extended-life cement slurries and methods of using extended-life cement slurries in subterranean formations.

Cement compositions are used in a variety of subterranean operations. For example, in subterranean well construction, a pipe string (e.g., casing, liners, expandable tubulars, etc.) can be run into a wellbore and cemented in place. The process of cementing the pipe string in place is commonly referred to as "primary cementing." In a typical primary cementing method, a cement composition can be pumped into an annulus between the walls of the wellbore and the exterior surface of the pipe string disposed therein. The cement composition may set in the annular space, thereby forming an annular sheath of hardened, substantially impermeable cement (i.e., a cement sheath) that may support and position the pipe string in the wellbore and may bond the exterior surface of the pipe string to the subterranean formation. Among other things, the cement sheath surrounding the pipe string functions to prevent the migration of fluids in the annulus, as well as protecting the pipe string from corrosion. Cement compositions also may be used in remedial cementing methods, for example, to seal cracks or holes in pipe strings or cement sheaths, to seal highly permeable formation zones or fractures, to place a cement plug, and the like.

A broad variety of cement compositions have been used in subterranean cementing operations. In some instances, extended-life cement slurries have been used. Extended-life cement slurries are characterized by remaining in a pumpable fluid state for at least about one day (e.g., at least about 7 days, about 2 weeks, about 2 years or more) at room temperature (e.g., about 80° F.) in quiescent storage. When desired for use, the extended-life cement slurries should be capable of being activated whereby reasonable compressive strengths are developed. For example, a cement set activator may be added to an extended-life cement slurry to form an activated composition whereby the activated composition sets into a hardened mass. Among other things, the extended-life cement slurries may be suitable for use in wellbore applications, for example, where it is desired to prepare the cement slurries in advance. This may allow, for example, the cement slurries to be stored prior to its use. In addition, this may allow, for example, the cement slurries to be prepared at a convenient location and then transported to the job site. Accordingly, capital expenditures may be reduced due to a reduction in the need for on-site bulk storage and mixing equipment. This may be particularly useful for offshore cementing operations where space onboard the vessel may be limited.

While extended-life cement slurries have been developed heretofore, challenges may exist with their successful use in subterranean cementing operations. For example, extended-life cement slurries developed hereto may require specific formulations of natural glasses and additives to remain in a pumpable fluid state. Furthermore, such specific formulations may be difficult to prepare, natural glasses from one region may differ from natural glasses that may be sourced from a different region, thereby potentially requiring extended-life cement compositions to be tailored to available materials in a region. Additional complexity may arise from the strong inorganic acids relied upon to extend slurry life, which in turn may require strong activators to overcome the retarding effects of the strong inorganic acids. Finally, there may be challenges to formulate an extended-life slurry which forms the required compressive strength (e.g. 24 hour compressive strength) at lower temperatures, such as, lower than about 140° F. (60° C.) for some extended-life slurries.

BRIEF DESCRIPTION OF THE DRAWINGS

These drawings illustrate certain aspects of some of the embodiments of the present method and should not be used to limit or define the method.

DETAILED DESCRIPTION

Figure 1:
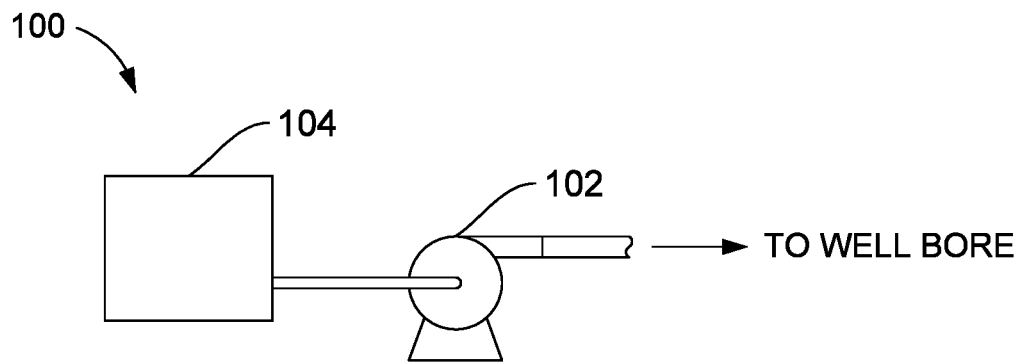
FIG. 1 illustrates a system for the preparation and delivery of an extended-life cement composition to a wellbore in accordance with certain embodiments.

Disclosed herein are examples, which may relate to subterranean cementing operations and, in certain instances, to extended-life cement slurries and methods of using extended-life cement compositions in slurry formulations. Extended-life cement slurries may be designed utilizing cement slurry design techniques disclosed herein. The disclosed slurry design techniques may allow cement slurries to be formulated, which do not set to form a hardened mass for an extended period of time. Extended-life cement slurries are characterized by remaining in a pumpable fluid state for at least about one day (e.g., at least about 7 days, about 2 weeks, about 2 years or more) at room temperature (e.g., about 80° F.) in quiescent storage. An extended-life cement slurry may be activated at a later time to form an activated slurry, which may then form a hardened mass. Extended-life cement slurry and extended-life cement composition may be used interchangeably herein. However, extended-life cement slurry generally refers to a prepared slurry, i.e. a mixture of water and cementitious components, whereas extended-life cement composition generally refers to a list of components that make up an extended-life cement slurry without necessarily physically preparing the extended-life cement slurry.

Conventional cement compositions typically include Portland cement and water. When first mixed, the water and Portland cement constitute a paste where water surrounds all the individual grains of Portland cement to make a plastic mixture. A chemical reaction called hydration takes place between the water and Portland cement which causes the composition to change from a plastic state to a solid state in a period of about two hours at room temperature (e.g. about 80° F.). After about two hours, the cement develops a measurable compressive strength, which may increase to a final compressive strength over a period of weeks. After the initial mixing of the water and cement, unmodified Portland cement typically remains pumpable for a period of about one hour before becoming too viscous to pump. The pump time of Portland cement may be modified using cement retarders, which are believed to slow the hydration reaction thereby allowing the cement composition to remain in a pumpable fluid state for longer. Cement retarders can typically be used extend the pump time of cements for a period of several hours. While cement retarders may allow for pump times to be extended, the hydration reaction is still occurring within the cement slurry, which will ultimately lead to the slurry to form a hardened mass, thus limiting the effective time that a cement may be extended by cement retarders. Inclusion of a relatively larger amount of cement retarder in a cement composition may extend the pump time beyond several hours but typically also results in a set cement that does not have the desired physical properties such as compressive strength. As such, there are upper limits on the amount of time that Portland cement-based slurries can be extended utilizing cement retarders before the retarder concentration interferes with the hydration of the Portland cement.

In contrast, extended-life cement slurries may remain in a pumpable fluid state for a longer period of time than retarded Portland cements while retaining the ability to be activated and set to form a hardened mass with desired physical properties such as compressive strength. While the extended-life cement slurries described herein may contain Portland cement as well as some cement retarders which may be found in a conventional Portland cement slurry, Portland cement slurries do not have the same physical properties as the extended-life cement slurries described herein. The design process for extended-life cement slurries imparts unique characteristics, such as the ability to remain in a pumpable fluid state for an extended period of time, to the extended-life cement slurries by choosing cement components with physicochemical properties that promote desired physical properties.

One of the challenges in creating an extended-life cement slurry may be the tailoring of the cement slurry for the required objective of remaining in a pumpable fluid state for at least about one day (e.g., at least about 7 days, about 2 weeks, about 2 years or more) at well site storage conditions. Oftentimes an extended-life cement slurry may be stored at a wellbore location, such as a well pad, while exposed to ambient temperature. There is often no mechanism by which to store the extended-life cement slurry under temperature-controlled conditions. As such, the extended-life cement slurry will often experience a range of temperatures from day to night which may cause undesired effects such as gelation of the extended-life cement slurry. Extended-life cement slurries may be tailored to address the conditions under which the slurry is stored at a well site as well as the downhole parameters required to complete the cement job. For example, a slurry stored at 70° F. surface temperature will necessarily need to have a different composition compared to a slurry stored at 110° F. while also meeting the downhole requirements for an effective barrier. Additionally, other design challenges must be met as well, such as daily fluctuations in the storage temperature which and required storage time. Some systems require daily agitation while others can sit dormant for longer. Due to the large number of individual variables required to be accounted for in creating an extended-life cement with the desired properties, the laboratory process of trial and error to generate the extended-life cement slurry may be time consuming and cost prohibitive. Disclosed herein are modeling methods which may allow for an extended-life cement slurry without trial and error methodology.

As described above, using an extended-life cement slurry to cement a wellbore is a two part process of storage and pumping. In the first part, the extended-life cement slurry is stored at a location, such as a well pad, for a period of hours to days before the wellbore is to be cemented. Once the wellbore is ready for cement, the extended-life cement slurry may be activated and pumped into the wellbore. The process of activating the extended-life cement slurry may occur in two ways. The first is that the extended-life cement slurry may be introduced into the wellbore and thermally activated by the elevated temperature in the wellbore. The second is that an activator may be mixed with the extended-life cement slurry before pumping the extended-life cement slurry into the wellbore.

Extended-life cement compositions described herein may generally include a hydraulic cement, one or more supplementary cementitious materials, a cement retarder, and water. A variety of hydraulic cements may be utilized in accordance with the present disclosure, including, but not limited to, those comprising calcium, aluminum, silicon, oxygen, iron, and/or sulfur, which set and harden by reaction with water. Suitable hydraulic cements may include, but are not limited to, Portland cements, pozzolana cements, gypsum cements, high alumina content cements, silica cements, and any combination thereof. In certain examples, the hydraulic cement may include a Portland cement. In some examples, the Portland cements may include Portland cements that are classified as Classes A, C, H, and G cements according to American Petroleum Institute, *API Specification for Materials and Testing for Well Cements*, API Specification 10, Fifth Ed., Jul. 1, 1990. In addition, hydraulic cements may include cements classified by American Society for Testing and Materials (ASTM) in C150 (Standard Specification for Portland Cement), C595 (Standard Specification for Blended Hydraulic Cement) or C1157 (Performance Specification for Hydraulic Cements) such as those cements classified as ASTM Type I, II, or III. The hydraulic cement may be included in the extended-life cement composition in any amount suitable for a particular composition. Without limitation, the hydraulic cement may be included in the extended-life cement slurries in an amount in the range of from about 10% to about 80% by weight of dry blend in the extended-life cement composition. For example, the hydraulic cement may be present in an amount ranging between any of and/or including any of about 10%, about 15%, about 20%, about 25%, about 30%, about 35%, about 40%, about 45%, about 50%, about 55%, about 60%, about 65%, about 70%, about 75%, or about 80% by weight of the extended-life cement compositions.

The water may be from any source provided that it does not contain an excess of compounds that may undesirably affect other components in the extended-life cement compositions. For example, an extended-life cement composition may include fresh water or saltwater. Saltwater generally may include one or more dissolved salts therein and may be saturated or unsaturated as desired for a particular application. Seawater or brines may be suitable for use in some examples. Further, the water may be present in an amount sufficient to form a pumpable slurry. In certain examples, the water may be present in the extended-life cement composition in an amount in the range of from about 33% to about 200% by weight of the cementitious materials. For example, the water in the extended-life cement composition may be present in an amount ranging between any of and/or including any of about 33%, about 50%, about 75%, about 100%, about 125%, about 150%, about 175%, or about 200% by weight of the cementitious materials. The cementitious materials referenced may include all components which contribute to the compressive strength of the extended-life cement composition such as the hydraulic cement and supplementary cementitious materials, for example.

As mentioned above, the extended-life cement composition may include supplementary cementitious materials. The supplementary cementitious material may be any material that contributes to the compressive strength of the extended-life cement composition. Some supplementary cementitious materials may include, without limitation, fly ash, blast furnace slag, silica fume, pozzolans, kiln dust, and clays, for example.

The extended-life cement composition may include kiln dust as a supplementary cementitious material. "Kiln dust," as that term is used herein, refers to a solid material generated as a by-product of the heating of certain materials in kilns. The term "kiln dust" as used herein is intended to include kiln dust made as described herein and equivalent forms of kiln dust. Depending on its source, kiln dust may exhibit cementitious properties in that it can set and harden in the presence of water. Examples of suitable kiln dusts include cement kiln dust, lime kiln dust, and combinations thereof. Cement kiln dust may be generated as a by-product of cement production that is removed from the gas stream and collected, for example, in a dust collector. Usually, large quantities of cement kiln dust are collected in the production of cement that are commonly disposed of as waste. The chemical analysis of the cement kiln dust from various cement manufactures varies depending on a number of factors, including the particular kiln feed, the efficiencies of the cement production operation, and the associated dust collection systems. Cement kiln dust generally may include a variety of oxides, such as $SiO_2$, $Al_2O_3$, $Fe_2O_3$, $CaO$, $MgO$, $SO_3$, $Na_2O$, and $K_2O$. The chemical analysis of lime kiln dust from various lime manufacturers varies depending on several factors, including the particular limestone or dolomitic limestone feed, the type of kiln, the mode of operation of the kiln, the efficiencies of the lime production operation, and the associated dust collection systems. Lime kiln dust generally may include varying amounts of free lime and free magnesium, lime stone, and/or dolomitic limestone and a variety of oxides, such as $SiO_2$, $Al_2O_3$, $Fe_2O_3$, $CaO$, $MgO$, $SO_3$, $Na_2O$, and $K_2O$, and other components, such as chlorides. A cement kiln dust may be added to the extended-life cement composition prior to, concurrently with, or after activation. Cement kiln dust may include a partially calcined kiln feed which is removed from the gas stream and collected in a dust collector during the manufacture of cement. The chemical analysis of CKD from various cement manufactures varies depending on a number of factors, including the particular kiln feed, the efficiencies of the cement production operation, and the associated dust collection systems. CKD generally may comprise a variety of oxides, such as $SiO_2$, $Al_2O_3$, $Fe_2O_3$, $CaO$, $MgO$, $SO_3$, $Na_2O$, and $K_2O$. The CKD and/or lime kiln dust may be included in examples of the extended-life cement composition in an amount suitable for a particular application.

In some examples, the extended-life cement composition may further include one or more of slag, natural glass, shale, amorphous silica, or metakaolin as a supplementary cementitious material. Slag is generally a granulated, blast furnace by-product from the production of cast iron including the oxidized impurities found in iron ore. The extended-life cement may further include perlite. Perlite is an ore and generally refers to a naturally occurring volcanic, amorphous siliceous rock including mostly silicon dioxide and aluminum oxide. The perlite may be expanded and/or unexpanded as suitable for a particular application. The expanded or unexpanded perlite may also be ground, for example. The extended-life cement may further include shale. A variety of shales may be suitable, including those including silicon, aluminum, calcium, and/or magnesium. Examples of suitable shales include vitrified shale and/or calcined shale.

In some examples, the extended-life cement composition may further include amorphous silica as a supplementary cementitious material. Amorphous silica is a powder that may be included in embodiments to increase cement compressive strength. Amorphous silica is generally a byproduct of a ferrosilicon production process, wherein the amorphous silica may be formed by oxidation and condensation of gaseous silicon suboxide, SiO, which is formed as an intermediate during the process.

In some examples, the extended-life cement composition may further include a variety of fly ashes as a supplementary cementitious material which may include fly ash classified as Class C, Class F, or Class N fly ash according to American Petroleum Institute, API Specification for Materials and Testing for Well Cements, API Specification 10, Fifth Ed., Jul. 1, 1990. In some examples, the extended-life cement composition may further include zeolites as supplementary cementitious materials. Zeolites are generally porous alumino-silicate minerals that may be either natural or synthetic. Synthetic zeolites are based on the same type of structural cell as natural zeolites and may comprise aluminosilicate hydrates. As used herein, the term "zeolite" refers to all natural and synthetic forms of zeolite.

Where used, one or more of the aforementioned supplementary cementitious materials may be present in the extended-life cement composition. For example, without limitation, one or more supplementary cementitious materials may be present in an amount of about 0.1% to about 80% by weight of the extended-life cement composition. For example, the perlite may be present in an amount ranging between any of and/or including any of about 0.1%, about 10%, about 20%, about 30%, about 40%, about 50%, about 60%, about 70%, or about 80% by weight of the extended-life cement.

In some examples, the extended-life cement composition may further include hydrated lime. As used herein, the term "hydrated lime" will be understood to mean calcium hydroxide. In some embodiments, the hydrated lime may be provided as quicklime (calcium oxide) which hydrates when mixed with water to form the hydrated lime. The hydrated lime may be included in examples of the extended-life cement composition, for example, to form a hydraulic composition with the supplementary cementitious components. For example, the hydrated lime may be included in a supplementary cementitious material-to-hydrated-lime weight ratio of about 10:1 to about 1:1 or 3:1 to about 5:1. Where present, the hydrated lime may be included in the set extended-life cement composition in an amount in the range of from about 10% to about 100% by weight of the extended-life cement composition, for example. In some examples, the hydrated lime may be present in an amount ranging between any of and/or including any of about 10%, about 20%, about 40%, about 60%, about 80%, or about 100% by weight of the extended-life cement composition. In some examples, the cementitious components present in the extended-life cement composition may consist essentially of one or more supplementary cementitious materials and the hydrated lime. For example, the cementitious components may primarily comprise the supplementary cementitious materials and the hydrated lime without any additional components (e.g., Portland cement, fly ash, slag cement) that hydraulically set in the presence of water.

Lime may be present in the extended-life cement composition in several; forms, including as calcium oxide and or calcium hydroxide or as a reaction product such as when Portland cement reacts with water. Alternatively, lime may be included in the extended-life cement composition by amount of silica in the extended-life cement composition. An extended-life cement composition may be designed to have a target lime to silica weight ratio. The target lime to silica ratio may be a molar ratio, molal ratio, or any other equivalent way of expressing a relative amount of silica to lime. Any suitable target time to silica weight ratio may be selected including from about 10/90 lime to silica by weight to about 40/60 lime to silica by weight. Alternatively, about 10/90 lime to silica by weight to about 20/80 lime to silica by weight, about 20/80 lime to silica by weight to about 30/70 lime to silica by weight, or about 30/70 lime to silica by weight to about 40/63 lime to silica by weight.

Other additives suitable for use in subterranean cementing operations also may be included in embodiments of the extended-life cement composition. Examples of such additives include, but are not limited to: weighting agents, lightweight additives, gas-generating additives, mechanical-property-enhancing additives, lost-circulation materials, filtration-control additives, fluid-loss-control additives, defoaming agents, foaming agents, thixotropic additives, and combinations thereof. In embodiments, one or more of these additives may be added to the extended-life cement composition after storing but prior to the placement of an extended-life cement composition into a subterranean formation. In some examples, the extended-life cement composition may further include a dispersant. Examples of suitable dispersants include, without limitation, sulfonated-formaldehyde-based dispersants (e.g., sulfonated acetone formaldehyde condensate) or polycarboxylated ether dispersants. In some examples, the dispersant may be included in the extended-life cement composition in an amount in the range of from about 0.01% to about 5% by weight of the cementitious materials. In specific examples, the dispersant may be present in an amount ranging between any of and/or including any of about 0.01%, about 0.1%, about 0.5%, about 1%, about 2%, about 3%, about 4%, or about 5% by weight of the cementitious materials.

In some examples, the extended-life cement composition may further include a cement retarder. A broad variety of cement retarders may be suitable for use in the extended-life cement compositions. For example, the cement retarder may comprise phosphonic acids, such as ethylenediamine tetra (methylene phosphonic acid), diethylenetriamine penta(methylene phosphonic acid), etc.; lignosulfonates, such as sodium lignosulfonate, calcium lignosulfonate, etc.; salts such as stannous sulfate, lead acetate, monobasic calcium phosphate, organic acids, such as citric acid, tartaric acid, etc.; cellulose derivatives such as hydroxyl ethyl cellulose (HEC) and carboxymethyl hydroxyethyl cellulose (CMHEC); synthetic co- or ter-polymers comprising sulfonate and carboxylic acid groups such as sulfonate-functionalized acrylamide-acrylic acid co-polymers; borate compounds such as alkali borates, sodium metaborate, sodium tetraborate, potassium pentaborate; derivatives thereof, or mixtures thereof. Examples of suitable cement retarders include, among others, phosphonic acid derivatives. Generally, the cement retarder may be present in the extended-life cement composition in an amount sufficient to delay the setting for a desired time. In some examples, the cement retarder may be present in the extended-life cement composition in an amount in the range of from about 0.01% to about 10% by weight of the cementitious materials. In specific examples, the cement retarder may be present in an amount ranging between any of and/or including any of about 0.01%, about 0.1%, about 1%, about 2%, about 4%, about 6%, about 8%, or about 10% by weight of the cementitious materials.

Cement compositions generally should have a density suitable for a particular application. By way of example, the extended-life cement composition may have a density in the range of from about 4 pounds per gallon ("lbm/gal") (479 kg/m^3) to about 20 lbm/gal (2396 kg/m^3). In certain embodiments, the extended-life cement composition may have a density in the range of from about 8 lbm/gal (958 kg/m^3) to about 17 lbm/gal (2037 kg/m^3) or about 8 lbm/gal (958 kg/m^3) to about 14 lbm/gal (1677 kg/m^3). Examples of the extended-life cement compositions may be foamed or unfoamed or may comprise other means to reduce their densities, such as hollow microspheres, low-density elastic beads, or other density-reducing additives known in the art. In examples, the density may be reduced after storing the composition, but prior to placement in a subterranean formation.

As previously mentioned, the extended-life cement composition may have a property of being able to be stored in a pumpable fluid state for at least one day (e.g., at least about 1 day, about 2 weeks, about 2 years or more) at room temperature (e.g., about 80° F.) in quiescent storage. For example, the extended-life cement compositions may remain in a pumpable fluid state for a period of time from about 1 day to about 7 days or more. In some examples, the extended-life cement compositions may remain in a pumpable fluid state for at least about 1 day, about 7 days, about 10 days, about 20 days, about 30 days, about 40 days, about 50 days, about 60 days, or longer. A fluid is considered to be in a pumpable fluid state where the fluid has a consistency of less than 70 Bearden units of consistency ("Bc"), as measured on a pressurized consistometer in accordance with the procedure for determining cement thickening times set forth in API RP Practice 10B-2, *Recommended Practice for Testing Well Cements*, First Edition, July 2005.

When desired for use, examples of the extended-life cement compositions may be activated (e.g., by combination with an activator) to set into a hardened mass. The term "cement set activator" or "activator", as used herein, refers to an additive that activates an extended-life cement composition such that the extended life cement composition sets to form a hardened mass. An extended-life cement composition comprising an activator may be referred to as an activated cement slurry. As discussed above, a feature of extended-life cement compositions is that the hydration reaction that causes the extended-life cement composition to set may be slowed to a point such that the extended-life cement composition can remain in a pumpable fluid state for an extended period of time. While some activators may also have accelerating properties that increase the rate of reaction, a conventional Portland cement accelerator may not always be an activator for the extended-life cement compositions. By way of example, the extended-life cement composition may be activated to form a hardened mass in a time period in the range of from about 1 hour to about 12 hours. Alternatively, the extended-life cement composition may set to form a hardened mass in a time period ranging between any of and/or including any of about 1 day, about 2 days, about 4 days, about 6 days, about 8 days, about 10 days, or about 12 days.

In some examples, a cement set activator may be added to the extended-life cement composition when it is desired to set the extended-life cement composition to form a hardened mass. Examples of suitable cement set activators include, but are not limited to: zeolites, amines such as triethanolamine, diethanolamine; silicates such as sodium silicate; zinc formate; calcium acetate; Groups IA and IIA hydroxides such as sodium hydroxide, magnesium hydroxide, and calcium hydroxide; monovalent salts such as sodium chloride; divalent salts such as calcium chloride; nanosilica (i.e., silica having a particle size of less than or equal to about 100 nanometers); polyphosphates; and combinations thereof. In some embodiments, a combination of the polyphosphate and a monovalent salt may be used for activation. The monovalent salt may be any salt that dissociates to form a monovalent cation, such as sodium and potassium salts. Specific examples of suitable monovalent salts include potassium sulfate, and sodium sulfate. A variety of different polyphosphates may be used in combination with the monovalent salt for activation of the extended-life cement compositions, including polymeric metaphosphate salts, phosphate salts, and combinations thereof. Specific examples of polymeric metaphosphate salts that may be used include sodium hexametaphosphate, sodium trimetaphosphate, sodium tetrametaphosphate, sodium pentametaphosphate, sodium heptametaphosphate, sodium octametaphosphate, and combinations thereof. A specific example of a suitable cement set activator comprises a combination of sodium sulfate and sodium hexametaphosphate. In some examples, the activator may be provided and added to the extended-life cement compositions as a liquid additive, such as, a liquid additive including a monovalent salt, a polyphosphate, and optionally a dispersant.

Some examples may include a cement set activator including a combination of a monovalent salt and a polyphosphate. The monovalent salt and the polyphosphate may be combined prior to addition to the extended-life cement composition or may be separately added to the extended-life cement composition. The monovalent salt may be any salt that dissociates to form a monovalent cation, such as sodium and potassium salts. Specific examples of suitable monovalent salts include potassium sulfate and sodium sulfate. A variety of different polyphosphates may be used in combination with the monovalent salt for activation of the extended-life cement compositions, including polymeric metaphosphate salts, phosphate salts, and combinations thereof, for example. Specific examples of polymeric metaphosphate salts that may be used include sodium hexametaphosphate, sodium trimetaphosphate, sodium tetrametaphosphate, sodium pentametaphosphate, sodium heptametaphosphate, sodium octametaphosphate, and combinations thereof. A specific example of a suitable cement set activator includes a combination of sodium sulfate and sodium hexametaphosphate. Because of the unique chemistry of polyphosphates, polyphosphates may be used as a cement set activator for examples of the extended-life cement compositions disclosed herein. The ratio of the monovalent salt to the polyphosphate may range, for example, from about 5:1 to about 1:25 or from about 1:1 to about 1:10. Examples of the cement set activator may include the monovalent salt and the polyphosphate salt in a ratio (monovalent salt to polyphosphate) ranging between any of and/or including any of about 5:1, 2:1, about 1:1, about 1:2, about 1:5, about 1:10, about 1:20, or about 1:25.

In some examples, the combination of the monovalent salt and the polyphosphate may be mixed with a dispersant and water to form a liquid additive for activation of an extended-life cement composition. Examples of suitable dispersants include, without limitation, the previously described dispersants, such as sulfonated-formaldehyde-based dispersants and polycarboxylated ether dispersants. One example of a suitable sulfonated-formaldehyde-based dispersant is a sulfonated acetone formaldehyde condensate.

The cement set activator may be added to examples of the extended-life cement composition in an amount sufficient to induce the extended-life cement composition to set into a hardened mass. In certain examples, the cement set activator may be added to the extended-life cement composition in an amount in the range of about 0.1% to about 20% by weight of the cementitious materials. In specific embodiments, the cement set activator may be present in an amount ranging between any of and/or including any of about 0.1%, about 1%, about 5%, about 10%, about 15%, or about 20% by weight of the cementitious materials. In some examples, a cement activator may not be required such as in high temperature applications where the extended-life cement composition may thermally activate and set to form a hardened mass without adding an activator.

In some examples, the extended-life cement compositions may set to have a desirable compressive strength after activation. Compressive strength is generally the capacity of a material or structure to withstand axially directed pushing forces. The compressive strength may be measured at a specified time after the extended-life cement composition has been activated and the resultant composition is maintained under specified temperature and pressure conditions. Compressive strength can be measured by either destructive or non-destructive methods. The destructive method physically tests the strength of treatment fluid samples at various points in time by crushing the samples in a compression-testing machine. The compressive strength is calculated from the failure load divided by the cross-sectional area resisting the load and is reported in units of pound-force per square inch (psi). Non-destructive methods may employ a UCA™ ultrasonic cement analyzer, available from Fann Instrument Company, Houston, Tex. Compressive strength values may be determined in accordance with API RP 10B-2, *Recommended Practice for Testing Well Cements*, First Edition, July 2005.

By way of example, the extended-life cement compositions may develop a 24-hour compressive strength in the range of from about 50 psi (344 kPa) to about 5000 psi (34473 kPa), alternatively, from about 100 psi (689 kPa) to about 4500 psi (31026 kPa), or alternatively from about 500 psi (3447 kPa) to about 4000 psi (27579 kPa). In some examples, the extended-life cement composition may develop a compressive strength in 24 hours of at least about 50 psi (344 kPa), at least about 100 psi (689 kPa), at least about 500 psi (3447 kPa), or more. In some examples, the compressive strength values may be determined using destructive or non-destructive methods at a temperature ranging from 100° F. (37.7° C.) to 200° F. (93.3° C.).

The extended-life cement composition may have desirable thickening times after activation. Thickening time typically refers to the time a fluid, such as the extended-life cement composition, remains in a fluid state capable of being pumped. A number of different laboratory techniques may be used to measure thickening time. A pressurized consistometer, operated in accordance with the procedure set forth in the aforementioned API RP Practice 10B-2, may be used to measure whether a fluid is in a pumpable fluid state. The thickening time may be the time for the treatment fluid to reach 70 Bc and may be reported as the time to reach 70 Bc. In some embodiments, the cement compositions may have a thickening time of greater than about 1 hour, alternatively, greater than about 2 hours, alternatively greater than about 5 hours at 3,000 psi (20684 kPa) and temperatures in a range of from about 50° F. (10° C.) to about 400° F. (204° C.), alternatively, in a range of from about 80° F. (26.6° C.) to about 250° F. (121° C.), and alternatively at a temperature of about 140° F. (60° C.).

Referring now to FIG. 1, the preparation of an extended-life cement composition in accordance with example embodiments will now be described. FIG. 1 illustrates a system 100 for the preparation of an extended-life cement composition and subsequent delivery of the composition to a wellbore in accordance with certain embodiments. The extended-life cement composition may be prepared according to any method disclosed herein such that the extended-life cement composition has the property of being able to remain in a pumpable fluid state for an extended period of time. As shown, the extended-life cement composition may be mixed in mixing equipment 104, such as a jet mixer, re-circulating mixer, or a batch mixer, for example, and then pumped via pumping equipment 102 to the wellbore. In some embodiments, the mixing equipment 104 and the pumping equipment 102 may be disposed on one or more cement trucks. In some embodiments, a jet mixer may be used, for example, to continuously mix the lime/settable material with the water as it is being pumped to the wellbore. In extended-life embodiments, a re-circulating mixer and/or a batch mixer may be used to mix the extended-life cement composition, and the activator may be added to the mixer as a powder prior to pumping the cement composition downhole. Additionally, batch mixer type units for the slurry may be plumbed in line with a separate tank containing a cement set activator. The cement set activator may then be fed in-line with the slurry as it is pumped out of the mixing unit.

Figure 2:
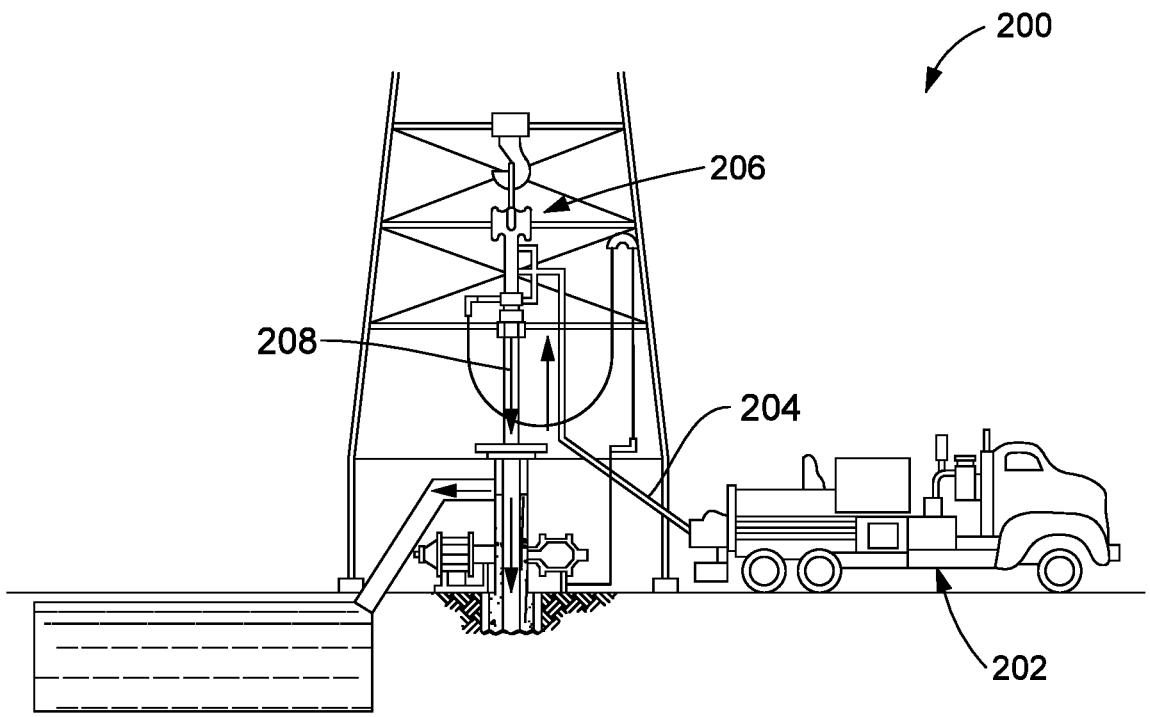
FIG. 2 illustrates surface equipment that may be used in the placement of an extended-life cement composition in a wellbore in accordance with certain embodiments.

An example technique for placing an extended-life cement composition into a subterranean formation will now be described with reference to FIGS. 2 and 3. FIG. 2 illustrates surface equipment 200 that may be used in placement of an extended-life cement composition in accordance with certain embodiments. It should be noted that while FIG. 2 generally depicts a land-based operation, however, the principles described herein are equally applicable to subsea operations that employ floating or sea-based platforms and rigs, without departing from the scope of the disclosure. As illustrated by FIG. 2, the surface equipment 200 may include a cementing unit 202, which may include one or more cement trucks. The cementing unit 202 may include mixing equipment 104 and pumping equipment 102 (e.g., FIG. 1). The cementing unit 202 may pump an extended-life cement composition through a feed pipe 204 and to a cementing head 206 which conveys the extended-life cement composition 14 downhole.

Figure 3:
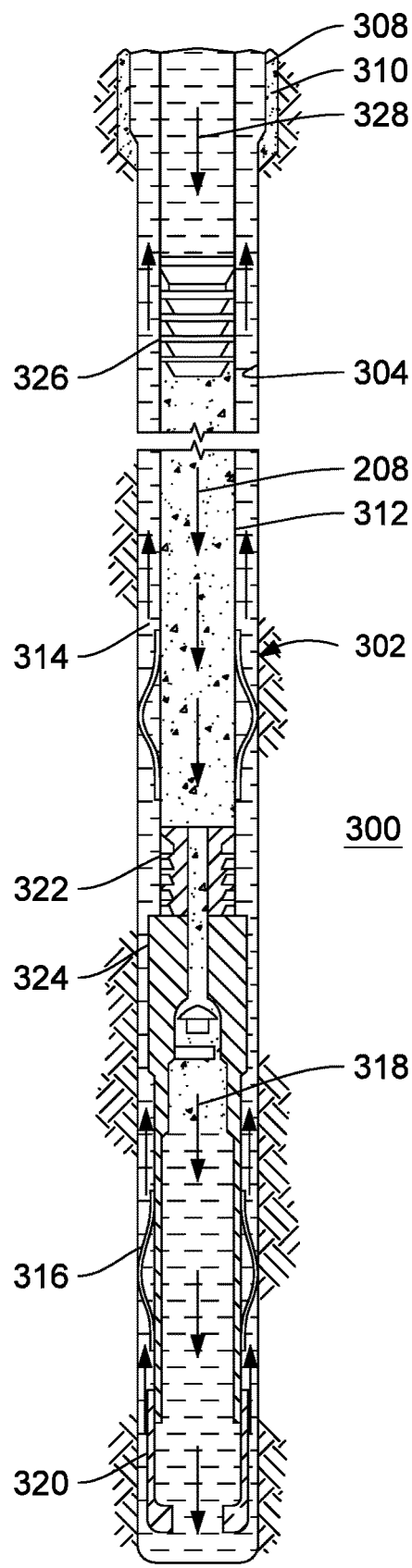
FIG. 3 illustrates the placement of an extended-life cement composition into a wellbore annulus in accordance with certain embodiments.

Turning now to FIG. 3, the extended-life cement composition 306 may be placed into a subterranean formation 300 in accordance with example embodiments. As illustrated, a wellbore 302 may be drilled into the subterranean formation 300. While wellbore 302 is shown extending generally vertically into the subterranean formation 300, the principles described herein are also applicable to wellbores that extend at an angle through the subterranean formation 300, such as horizontal and slanted wellbores. As illustrated, the wellbore 302 comprises walls 304. In the illustrated embodiment, a surface casing 308 has been inserted into the wellbore 302. The surface casing 308 may be cemented to the walls 304 of the wellbore 302 by cement sheath 310. In the illustrated embodiment, one or more additional conduits (e.g., intermediate casing, production casing, liners, etc.), shown here as casing 312 may also be disposed in the wellbore 302. As illustrated, there is a wellbore annulus 314 formed between the casing 312 and the walls 304 of the wellbore 302 and/or the surface casing 308. One or more centralizers 316 may be attached to the casing 312, for example, to centralize the casing 312 in the wellbore 302 prior to and during the cementing operation.

With continued reference to FIG. 3, the extended-life cement composition 306 may be pumped down the interior of the casing 312. The extended-life cement composition 306 may be allowed to flow down the interior of the casing 312 through the casing shoe 320 at the bottom of the casing 312 and up around the casing 312 into the wellbore annulus 314. The extended-life cement composition 306 may be allowed to set in the wellbore annulus 314, for example, to form a cement sheath that supports and positions the casing 312 in the wellbore 302. While not illustrated, other techniques may also be utilized for introduction of the extended-life cement composition 306. By way of example, reverse circulation techniques may be used that include introducing the extended-life cement composition 306 into the subterranean formation 300 by way of the wellbore annulus 314 instead of through the casing 312.

As it is introduced, the extended-life cement composition 306 may displace other fluids 318, such as drilling fluids and/or spacer fluids that may be present in the interior of the casing 312 and/or the wellbore annulus 314. At least a portion of the displaced fluids 318 may exit the wellbore annulus 314 via a flow line and be deposited, for example, in one or more retention pits (e.g., a mud pit). Referring again to FIG. 3, a bottom plug 322 may be introduced into the wellbore 302 ahead of the extended-life cement composition 306, for example, to separate the extended-life cement composition 306 from the fluids 318 that may be inside the casing 312 prior to cementing. After the bottom plug 322 reaches the landing collar 324, a diaphragm or other suitable device should rupture to allow the extended-life cement composition 306 through the bottom plug 322. In FIG. 3, the bottom plug 322 is shown on the landing collar 324. In the illustrated embodiment, a top plug 326 may be introduced into the wellbore 302 behind the extended-life cement composition 306. The top plug 326 may separate the extended-life cement composition 306 from a displacement fluid 328 and also push the extended-life cement composition 306 through the bottom plug 322.

A method of designing an extended-life cement composition may include two primary steps. The first step is making the cement storable and the step is to activate the cement to achieve a desired thickening time. In the first step, parameters such as process conditions, bulk material availability, and engineering parameters required of the cement composition may be specified. Process conditions may be the well bore conditions of a target well to be cemented but may also be target conditions provided by a customer or conditions required by governmental regulations. Bulk material availability is typically location dependent whereby some geographic locations may have access to bulk materials that other geographic locations do not. Further, bulk materials such as natural glasses and cements may vary across geographic locations due to differences in raw materials for manufacturing and manufacturing methods, as well as natural variations among deposits of mineable minerals across geographic locations. The first step is making the cement storable may include using inputs of process conditions, bulk material availability, and engineering parameters required of the cement composition into a cement optimization model which outputs an extended-life cement composition which has the property of maximizing storage time at specified storage conditions while meeting the target strength, target thickening time, and lime requirements at target temperatures and pressures. The cement optimization model may include a cement compressive strength model and a storage time model. The extended-life cement composition output of the cement optimization model may include the identity and concentration of cement components such as hydraulic cements and supplementary cementitious materials which when blended to form a cement slurry has the property of remaining in a pumpable fluid state for at least the storage time at specified storage conditions such as temperature. In instances where an extended-life cement composition cannot be formed solely from the available bulk materials that can meet the storage time requirement at specified storage conditions, the cement optimization model may further include steps to determine a concentration and chemical identity of a cement retarder which may be included in the extended-life cement composition such that the extended-life cement composition has the property of being able to remain in a pumpable fluid state for at least the storage time at specified storage conditions such as temperature.

In wellbore cementing, it is often a requirement to place specific fluids in pre-defined areas in the wellbore to achieve zonal isolation often referred to as wellbore fluid hierarchy which may include fluid density hierarchy and rheological hierarchy. If the wellbore fluid hierarchy is not correct, different fluids may intermix or move past one another during dynamic conditions or may settle out to a different location under static conditions. Fluid density hierarchy is typically designed such that each successive fluid pumped into a wellbore to be cemented (e.g. spacer and cement) is denser than the previously pumped fluid such that after placement of the fluids in the wellbore the fluids will tend to stay in place and not migrate due to differences in density. Rheological hierarchy refers to the ability of fluids flowing through a wellbore to remain in the same relative position during pumping, so fluid do not move past each other in the wellbore. The relative positions of fluids in motion may be primarily a function of the friction gradient of the fluid whereby a fluid with a relatively higher friction gradient will displace a fluid with a relatively lower friction gradient when the fluids are in motion. As such, it is often a design consideration for cement composition to have a lower friction gradient than a spacer fluid used to displace the cement composition. A friction gradient for the extended-life cement composition may be specified during the first step of defining process conditions. The cement optimization model may further include functions to determine if a viscosifier or dispersing agent should be added to the extended-life cement composition to meet the friction gradient and rheological hierarchy requirement.

Figure 4:
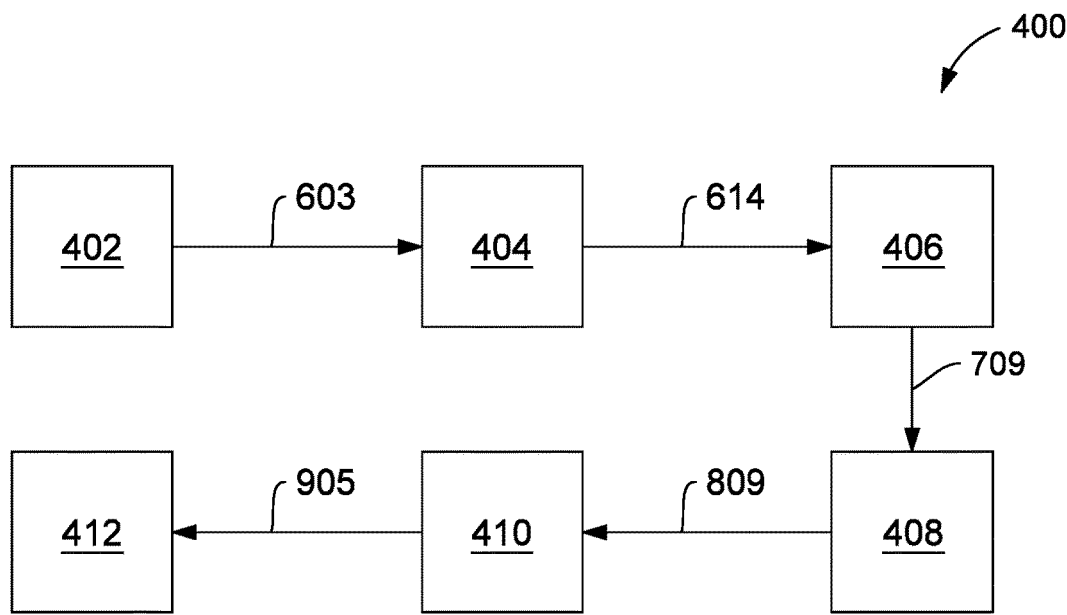
FIG. 4 is a flowchart illustrating an example method for designing an extended-life cement composition.

A method of preparing an extended-life cement composition will now be discussed in detail. The discussion below focuses on manual steps to prepare an extended-life cement composition and a model-based approach will be discussed later. FIG. 4 is a flow chart outlining the major steps in method 400 for preparing an extended-life cement. The method includes six principal steps. In step 402, the engineering parameters of the extended-life cement composition are defined. Some engineering parameters may include wellbore temperature, wellbore pressure, and compressive strength requirement, for example. Arrow 603 shows the engineering parameters set out in step 402 being passed to step 404. In step 404, a Portland cement and supplementary cementitious materials are selected that will meet the engineering parameters set out in step 402. Arrow 614 shows the Portland cement and supplementary cementitious materials selected in step 404 being passed to step 406. In step 406, a retarder and concentration thereof are selected that is compatible with the Portland cement selected in step 404 and the engineering parameters set out in step 402. Arrow 709 shows the retarder and concentration thereof being passed to step 408. In step 408, the extended-life cement composition is designed for rheological stability. Arrow 809 shows the results of step 408 being passed to step 410. In step 410 an activator and concentration thereof are selected that are compatible with the Portland cement selected in step 404 and meets the engineering parameters set out in step 402. Arrow 905 shows the activator and concentration thereof selected in step 410 being passed to step 412. Finally, step 412 includes verifying the compressive strength of the extended-life cement composition to verify the extended-life cement composition meets the engineering parameters set forth in step 402.

Step 402 may include defining the engineering parameters of the extended life cement composition. Typically, at least some of the engineering parameters are set in accordance with the conditions of the wellbore being cemented. For example, bottom hole static temperature and temperature gradient within the wellbore may be defined by logging operations which measure the temperature along a length of the wellbore. Additionally, the density requirements for a wellbore cement may be measured in the same way by measuring bottom hole static pressure and pressure gradient along the wellbore. Some engineering parameters may be defined by a customer, regulatory requirements, or by industry best practices. Some other engineering parameters may include final compressive strength, compressive strength development rate, thickening time, and gelling requirements, for example. Another engineering parameter that may be selected is slurry shelf life. As discussed above, a feature of extended-life cement composition is the property that the extended-life cement slurry can be stored in a pumpable fluid state for an extended period of time. As such, the desired "shelf life" time or shelf life stability or shelf life requirement may be defined as an engineering parameter of the extended-life cement composition.

Figure 5:
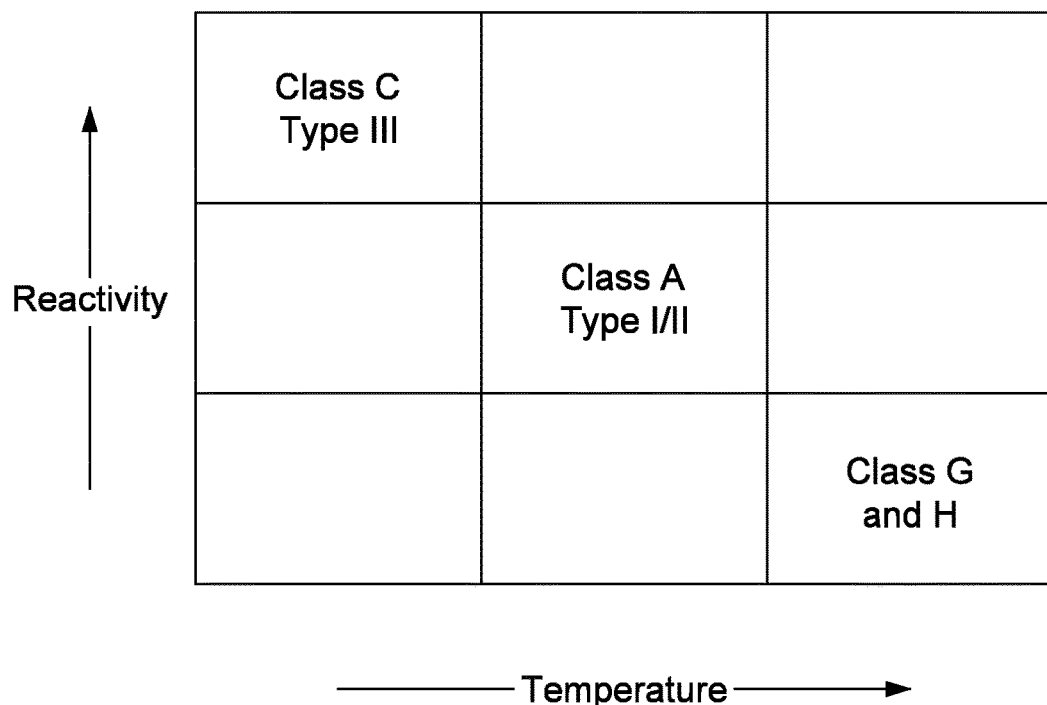
FIG. 5 is an example graph of reactivity for different classes of Portland cement.

Step 404 may include selecting a Portland cement that meets the engineering parameters set out in step 402. FIG. 5 shows a general trend of reactivity for different classes of Portland cement. Class C or ASTM type III Portland cement generally has a relatively higher reactivity at all temperatures than class A or ASTM type I/II and class G/H. Class A or ASTM type I/II generally has a higher reactivity at all temperatures than class G/H. As such, for a relatively low wellbore temperature, class C or ASTM type III may be required to meet engineering parameters such as rate of compressive strength development, and thickening time, for example as class A or ASTM type I/II and Class G/H may not be reactive enough at lower temperatures. Similarly, for relatively medium temperature wellbore, class A or ASTM type I/II may be selected to balance reactivity with higher temperature. Finally, for relatively higher temperature wellbores, class G/H cement may be selected as the reactivity may be appropriate for the relatively higher temperature where other Portland cements may react too quickly to be placed in the wellbore. In some examples, more than one Portland cement may be selected.

Figure 6:
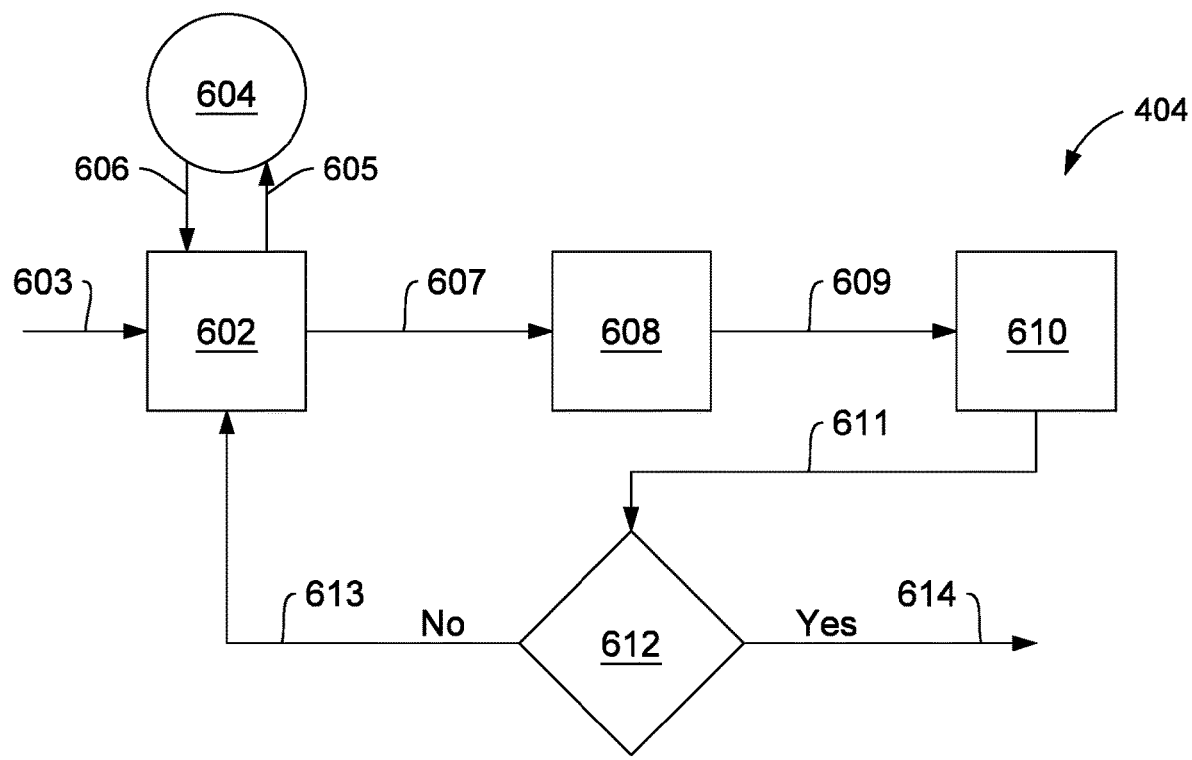
FIG. 6 is a flowchart illustrating an example method of selecting a Portland cement and supplementary cementitious material.

FIG. 6 is a flowchart illustrating a detailed procedure for step 404 for selecting a Portland cement and supplementary cementitious materials to be included in an extended-life cement composition. Step 404 as illustrated in FIG. 6 may begin with selecting a Portland cement in step 602. Step 602 may take as input the engineering parameters determined in step 402 in FIG. 4, show in FIG. 6 as arrow 603. From the input of arrow 603, a first approximation for the correct Portland cement may be determined based at least in part on the temperature defined by the engineering parameters. There may be more than one correct Portland cement that may meet the engineering parameters set for in step 402 based on temperature, however, as will be discussed in detail below, the Portland cement selected may not meet other engineering parameters such as shelf life stability. In step 602, the engineering parameters may be compared against a cement reactivity trend 604 illustrated by arrow 605. Cement reactivity trend 604 may be a reactivity trend such as that illustrated in FIG. 5 or may be any other cement reactivity trend which includes information about reactivity and temperature for various cements. In some examples, the cement reactivity trend may include a correlation of cement reactivity with temperature. Arrow 606 indicates information from cement reactivity trend 604 being transferred back to step 602.

From step 602, the selected Portland cement may be an input to step 608, indicated by arrow 607. In step 608, supplementary cementitious materials may be selected to impart physical and chemical properties to the extended-life cement slurry. A supplementary cementitious material selection matrix is shown in Matrix 1 below. In some examples, a supplementary cementitious material selection matrix may include correlations which may take as input engineering parameters defined above such as wellbore temperature and water to blend ratio and output a supplementary cementitious material appropriate for use based at least in part on the engineering parameters. Additionally, supplementary cementitious materials may be selected based as least in part on reactivity, temperature sensitivity of reactivity, and water requirement. Water requirement is typically defined as the amount of mixing water that is required to be added to a powdered, solid material to form a slurry of a specified consistency. Any of the previously mentioned supplementary cementitious materials may be included in an extended-life cement slurry. The water to blend ratio may be based on the Portland cement and SCM's selected for inclusion in the extended-life cement composition and the density set for in step 402.

| Matrix 1 | | | | |
|---|---|---|---|---|
| Wellbore Temperature | High | Select Low Reactive SCM with low WR | Select Low Reactive SCM with medium WR | Select Low Reactive SCM with medium WR |
| | Medium | Select High reactive SCM and Low Reactive SCM and mix 1:2 ratio | Select high reactive SCM and Low Reactive SCM and mix with 1:1 ratio | Select high reactive SCM and Low reactive SCM and mix 2:1 ratio |
| | Low | Select High reactive SCM with low WR | Select High Reactive SCM with medium WR | Select high Reactive SCM with high WR |
| | | Low | Medium | High |
| | | Water to Blend Ratio (blend = Portland plus SCM's) | | |

The supplementary cement components may be analyzed to determine their water requirement by any method. As the water requirement may be the amount of mixing water that is required to be added to a powdered, solid material to form a slurry of a specified consistency, one example technique for determining water requirement holds the consistency and amount of water constant while varying the amount of the solid material. However, techniques may also be applied that vary the amount of the water, the consistency, and/or the amount of solid material in any combination. Water requirement for a supplementary cementitious material may be determined by a process that includes a) preparing a blender (e.g., Waring® blender) with a specified amount of water (e.g., about 100 grams to about 500 grams), b) agitating the water at a specified blender rpm (e.g., 4,000 to 15,000 rpm), c) adding the powdered solid that is being investigated to the water until a specified consistency is obtained, and d) calculating the water requirement based on the ratio of water to solids required to obtain the desired consistency. A specific example for determining water requirement may include, but is not limited to: 1) preparing a blender (e.g., Waring® blender) with a specified amount of water (e.g., about 100 grams to about 500 grams or about 200 grams in one example); 2) agitating the water at a specified blender rpm (e.g., about 4,000 to about 15,000 rpm or about 12,000 rpm in one example); 3) adding a specified amount (e.g., about 1 gram to about 1,000 grams or about 400 grams in one example) of the cement component to the water; 4) observing mixture to determine if a specified consistency is obtained, for example, the cement component can be considered thoroughly wet and mixed if the vortex formed at the surface of the mixture in the blender is about 0 inches (0 mm) to about 2 inch (50 mm) or about 0.004 inches (0.1 mm) to about 1 inch (25 mm); 5) if the desired consistency is not obtained, add more cement component until desired consistency is obtained, for example, the vortex formed in the blender is about the size of a dime; and 6) calculate the water requirement based on the ratio of water to cement component to obtain the desired consistency. In some examples, the specific consistency may be where a vortex at the surface of the mixture in the blender is the size of a dime or about 0.7 in (17.9 mm). Other suitable techniques for determining the water requirement may also be used.

As is illustrated in the supplementary cementitious material selection matrix of Matrix 1, there may be two general trends to selection of supplementary cementitious materials. First, as the wellbore temperature is increased, a less reactive SCM may be chosen to reduce the reactivity of the extended-life cement composition. Conversely, as the wellbore temperature decreases, a more reactive SCM may be chosen to increase the reactivity of the extended-life cement composition. Second, as the water to cement blend ratio increases from a relatively lower water ratio to a higher water ratio, the water requirement of the SCM may increase to account for the additional water. The amount of water in the slurry may be a function of the density requirement of the cement composition, determined in step 402. In general, water may be less dense than cement and therefore an increased fraction of water yields a less dense cement slurry. As such, the water content of the cement slurry may be a function of required density and the water to blend ratio may be deemed low, medium, or high, depending on the amount of water required to reach the density specified in step 402. There may be a third factor in the SCM selection process where an intermediate reactivity is required due to an intermediate wellbore temperature. In such examples, two SCMs with disparate reactivity may be selected and mixed to form a compound SCM with intermediate reactivity. Additionally, water requirement for the compound SCM may be modulated by selecting SCMs with disparate water requirement that combine to form an intermediate water requirement. In examples where an intermediate reactivity is required and a low water requirement is required, two SCMs with relatively lower water requirement and disparate activities may be selected to form an intermediate reactivity, low water requirement compound SCM. Conversely, in examples where an intermediate reactivity is required and a high water requirement is required, two SCMs with relatively higher water requirement and disparate activities may be selected to form an intermediate reactivity, higher water requirement compound SCM.

Once the SCM or SCMs have been selected, an additional consideration in step 608 may be calculation of lime available to react with the Portland cement and SCMs. In general, lime is required to cause cementitious reactions to occur in cement compositions. Insufficient lime may cause the cement components to not completely react which may cause the set cement to not have the required engineering properties. Portland cements may release lime upon reaction with water. However, additional lime may be required to stoichiometrically balance the amount of lime provide by the Portland cement with lime provided by SCMs. Some SCMs may require additional lime to set as they may be devoid of free lime or lime that is released upon reaction with water. Oxide analysis or other analytical techniques performed on the SCM to determine the mineralogical makeup of the SCM or Portland cement which may then be utilized to determine additional lime required.

An additional consideration when selecting additional lime to include in the extended-life cement composition is that relatively more lime may limit the shelf life of the extended-life cement composition. Additional lime may cause cementitious hydration reactions to proceed in the extended life cement composition which may in turn cause gelation and setting of the extended-life cement composition. Conversely, limiting additional lime may prolong shelf life the extended-life cement composition.

After the supplementary cementitious materials and lime, if any, are selected in step 608, the selected materials may be passed to step 610 as indicated by arrow 609. In step 610, the selected Portland cement, SCM(s), lime, and water required to reach the density specified in step 402 may be combined to form a cement slurry. The cement slurry may be tested in a UCA, using as described above at the temperature and pressure defined in step 402. The UCA test may give information about the compressive strength and gelation of the cement slurry over a period of time. The results of the UCA test may then be compared against the engineering parameters defined in step 402, represented by arrow 611 and decision point 612. In decision point 612, the UCA tests may be compared against one or more engineering parameters such as compressive strength and gelation time to determine if the prepared cement composition needs to be adjusted. For example, if the prepared slurry is considered to have met the engineering parameters defined in step 402, the method may proceed to step 406, via arrow 614, as will be discussed below. Alternatively, if the compressive strength requirement is not met or gelation occurs with mixing, the prepared slurry may be considered to have not met the engineering parameters defined in step 402 and the method may proceed back to step 602 as indicated by arrow 613. Another Portland cement may then be selected that is not the same as the previously selected Portland cement and step 602, step 608, and step 610 may be repeated until a slurry that meets the engineering parameters defined in step 402 is found that meets compressive strength requirements and does not exhibit gelation beyond what is defined in step 402.

With further reference to FIG. 4, after the step of selecting Portland cement and SCMs in step 404, the method may proceed to step 406 whereby a retarder and concentration thereof may be selected. As discussed above, some engineering parameters set forth in step 402 may include the shelf life time or time required to remain in a pumpable fluid state and the rate of gelling. There may be a wide variety of retarders suitable for inclusion in an extended-life cement composition, only some of which may be enumerated herein. Matrix 2 is a listing of some retarders which may be included in the extended-life cement compositions.

| Matrix 2 | | |
|---|---|---|
| Type | Viscosity Effect | Relative Strength |
| Lignosulfonate | Dispersing | Medium |
| Synthetic | Neutral to Viscosifying | High |
| Inorganic | Neutral to Viscosifying | High |
| Sugars | Viscosifying | Medium |
| Organic Acids | Gel Control/Slight Dispersion | High |

Figure 7:
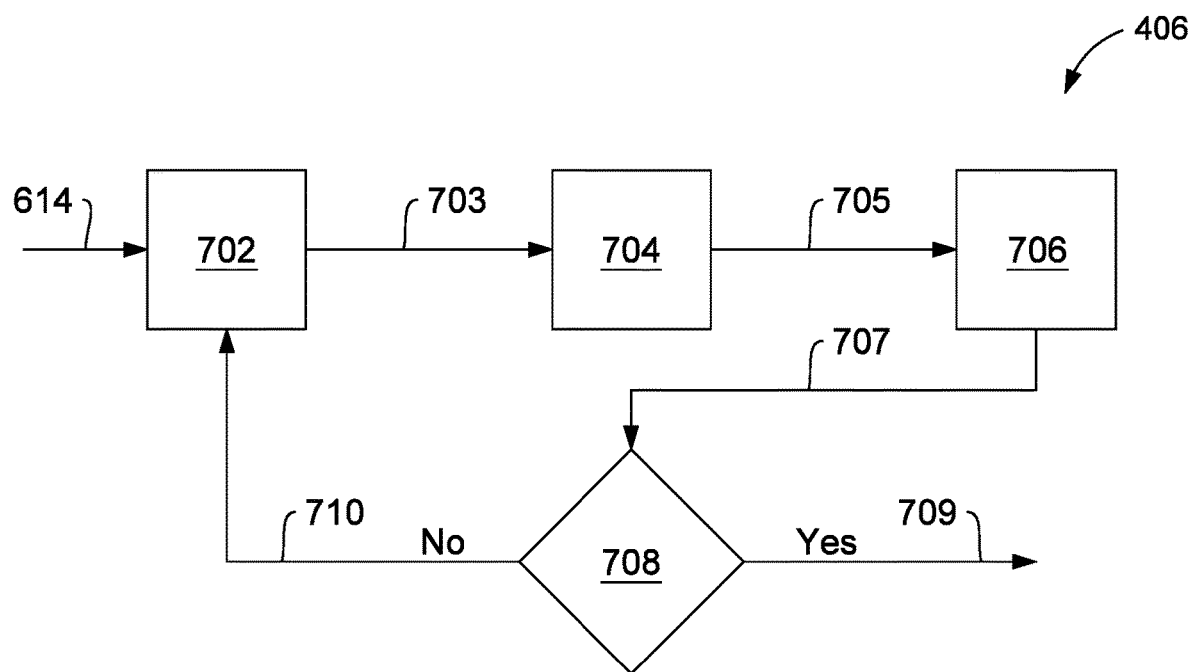
FIG. 7 is a flowchart illustrating an example method of selecting a cement retarder.

FIG. 7 is a flowchart illustrating a detailed procedure for step 406 for selecting a retarder and concentration thereof. Step 406 as illustrated in FIG. 7 may begin with selecting a retarder based on the shelf life and thickening time requirements from the engineering parameters defined in step 402. A retarder may be classified as a weak retarder if the effect on slowing the hydration reaction is not strong. Alternatively, a retarder may be classified as strong if the retarder slows the hydration reaction to a greater extent than the retarder classified as weak. As shown in Matrix 2, some retarders may also have secondary effects on viscosity which may affect the ability of an extended life cement composition to remain flowable. In step 702, a retarder may be selected based at least in part on the viscosifying effects of the retarder and relative strength of the retarder. Multiple concentrations of retarder may also be selected such that multiple quantification tests may be performed as will be described below. In some examples, a correlation may be utilized which correlates an input of engineering parameters and outputs a retarder based at least in part on the viscosifying effects of the retarder and relative strength of the retarder to meet the engineering parameters.

From step 702, the selected retarder and concentration thereof may be passed to step 704 as indicated by arrow 703. In step 704, the retarder's effect on setting may be quantified. The selected Portland cement and SCMs from step 404 may be combined with water and the retarder to form a cement slurry which may then be tested for multiple time periods. A plurality of cement slurries may be prepared with varying concentrations of the selected retarder to be tested. The prepared cement slurries may be monitored over multiple days to determine the effectiveness of the retarder on flowability of the cement slurries. For example, the flowability of each prepared cement slurry may be characterized as very flowable, flowable with slight resistance to mixing, flowable with high resistance to mixing, and not flowable. The flowability testing may be performed over a period of days to determine the longer term stability of the prepared cement slurries. Some tests may include monitoring flowability for 1 day, 2 days, 3 days, 7 days, 10 days, or longer. In some examples, a cement may have a flowability requirement. The results of the testing performed in step 704 may be compared against the engineering parameters set forth in step 402 to determine if the selected retarder and concentration thereof meets at least some of the engineering parameters. From step 704, the method may proceed to step 706 as indicated by arrow 705.

In step 706, the rate of gelling may be quantified. Cement slurries may be prepared including the selected Portland cement, SCMs, water, and retarder as in step 704. The rate of gelling may be quantified by any method. One method may include measuring gel strength in a viscometer at 3 RPM over a period of time. The results of the viscometer readings may be plotted and a best-fit slope of the data may be an indication of the rate of gelling.

From step 706, the method may proceed to decision point 708 whereby the prepared cement slurries from steps 704 and 706 may be compared to the engineering parameters set forth in step 402. If the prepared slurry is deemed to meet the engineering parameters, step 406 may be considered complete and the method may move to step 408 as indicated by arrow 709. If the slurries are deemed to not meet the engineering parameters, the method may proceed back to step 702 as indicate by arrow 710. Step 406 may then begin again with selection of another retarder with a different chemical identity than the first selected retarder.

Figure 8:
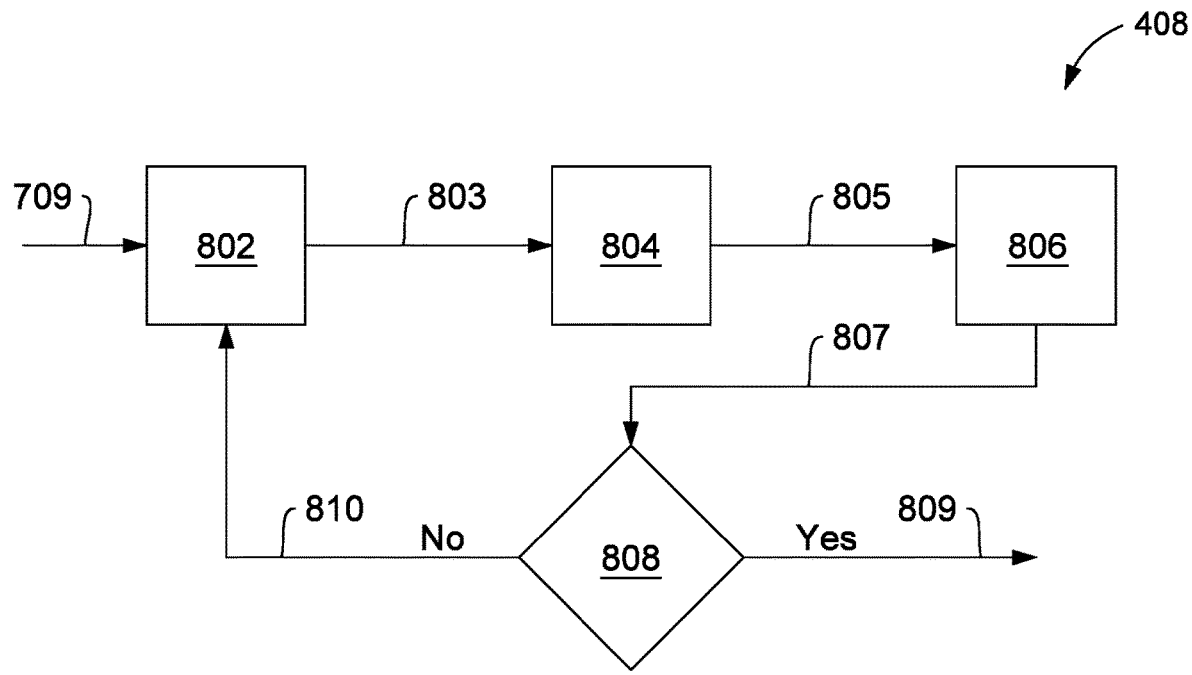
FIG. 8 is a flowchart illustrating an example method of designing an extended-life cement composition to have rheological stability.

With reference to FIG. 4, from step 406, the method may proceed to step 408 as indicated by arrow 709. In step 408, the rheological stability of the extended-life cement slurry may be adjusted. Some engineering parameters specified in step 402 may include the viscosity required to meet the rheological hierarchy at casing and annular shear rates as well as the rate of gelling that may occur from shearing the extended-life cement slurry. FIG. 8 is a flowchart illustrating a detailed procedure for step 408 to design the extended-life cement slurry to meet rheological stability requirements defined in step 402.

In FIG. 8, the method may begin with step 802 with the input from step 406 as indicated by arrow 709. In step 802 a viscosifier or dispersing agent and concentration thereof may be selected based on the results of the flowability results from step 704 and the gelling rate results from step 706 as shown in FIG. 7. Viscosifying agents and dispersing agents may be selected based at least in part on engineering parameters determined in step 402 such as wellbore temperature and from the water requirement of the Portland cement and SCMs selected in step 404. Any of the previously mentioned viscosifying agents and/or dispersing agents previously discussed may be included in examples of the extended-life cement composition. Matrix 3 is a selection matrix for selecting concentrations of viscosifying agents and dispersing agents based on the temperature provided in the engineering parameters of step 402 and the water requirement of the selected Portland cement and SCMs from step 404. The selection made in Matrix 3 may be a first guess for a starting concentration of viscosifying agents and/or dispersing agents. A final concentration of dispersant and viscosifier may be selected based on testing methods described below.

| Matrix 3 | | | | |
|---|---|---|---|---|
| Temperature | High | select 0.1%-0.2% BWOC dispersant/ viscosifier | select 0.2%-0.3% BWOC dispersant/viscosifier | select 0.2%-0.5% BWOC dispersant/ viscosifier |
| | Medium | select 0.1% BWOC dispersant/ viscosifier | select 0.1%-0.2% BWOC dispersant/ viscosifier | select 0.2 BWOC dispersant/ viscosifier |
| | Low | select 0.05%-0.1% BWOC dispersant/ viscosifier | select 0.1% BWOC dispersant/ viscosifier | select 0.1%-0.2% BWOC dispersant/ viscosifier |
| | | Low | Medium | High |
| | | Water to Blend Ratio (blend = Portland plus SCM's) | | |

In step 802 a viscosifier or dispersing agent and concentration thereof may be selected based on the results of the flowability results from step 704 and the gelling rate results from step 706 in view of the engineering parameters from step 402 and calculated water requirement determined in step 404. From step 802, the method may proceed to step 804 as indicated by arrow 803. In step 804, a plurality of cement slurries may be prepared that include the Portland cement, SCMs, retarder, water, and viscosifying and/or dispersing agent. The plurality of cement slurries may be prepared that includes varying concentrations of viscosifying and/or dispersing agents to determine the effects of concentration thereof on rheology. The prepared cement slurries may be tested in a consistometer at casing and/or annular shear rates to measure the apparent viscosity. From step 804, the method may proceed to step 806 where the gel strength for shelf life may be measured. A consistometer may be utilized at a specified RPM, such as 3 RPM, and the gel strength may be recorded over a period of time. For example, the test may include monitoring gel strength for 1 day, 2 days, 3 days, 7 days, 10 days, or longer. The results of gel strength testing pay be plotted and the slope of the best-fit line may be the rate of gelling. Although only one method of measuring apparent viscosity and rate of gelling are enumerated herein, there may be other tests for apparent viscosity and gel strength that may provide equivalent or similar information about gel strength and apparent viscosity.

From step 806, the method may proceed to step 808 as indicated by arrow 807. In decision point 808. In decision point 808, the results of step 804 and 806 may be compared against the engineering parameters defined in step 402. If one of the tested slurries is deemed to meet the engineering parameters, step 408 may be considered complete and the method may move to step 410 as indicated by arrow 809. If the slurries are deemed to not meet the engineering parameters, the method may proceed back to step 802 as indicate by arrow 810. Step 408 may then begin again with selection of another viscosifying and/or dispersing agent with a different chemical identity and steps 804 and 806 may be repeated to test the newly selected viscosifying and/or dispersing agent.

With further reference to FIG. 4, after the step of designing for rheological stability in step 408, the method may proceed to step 410 whereby an activator and concentration thereof may be selected. As discussed above, some engineering parameters set forth in step 402 may include the 24-hour compressive strength requirement or other strength requirements, which may be defined by regulation or best practices. There may be a wide variety of activators suitable for inclusion in an extended-life cement composition, only some of which may be enumerated herein. Any of the previously mentioned activators may be suitable for inclusion in an extended-life cement composition. As discussed above, some engineering parameters set forth in step 402 may include wellbore temperature, thickening time, and compressive strength at various times such as 24 hours, for example.

Figure 9:
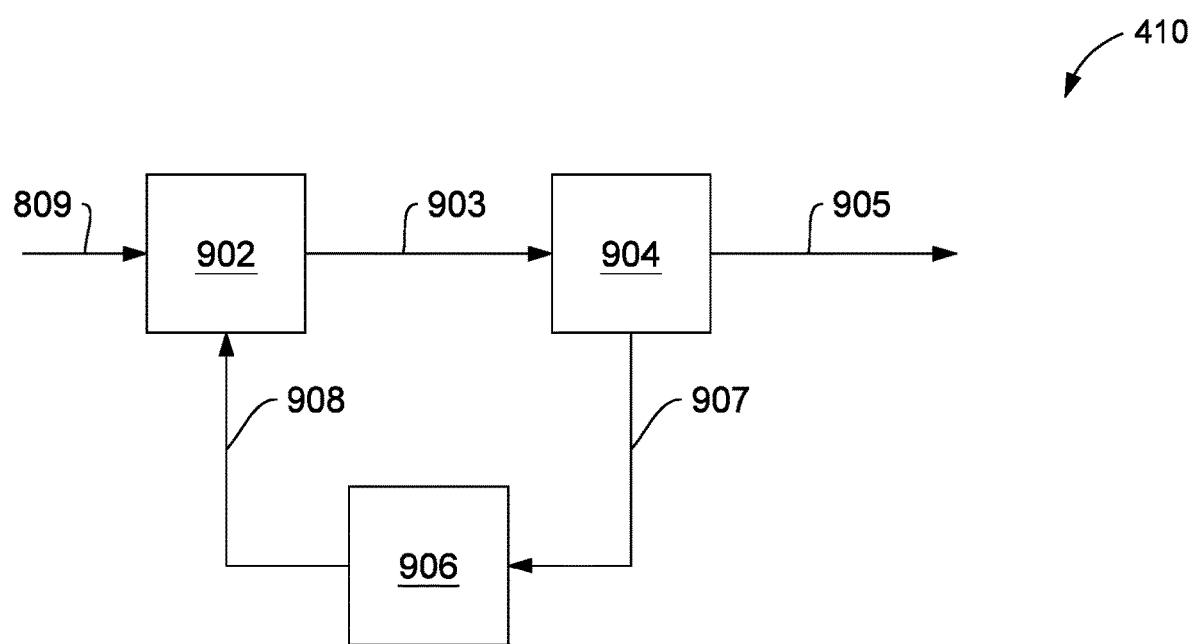
FIG. 9 is a flowchart illustrating an example method of selecting an activator.

FIG. 9 is a flowchart illustrating a detailed procedure for step 410 to select an activator and concentration thereof to meet the engineering parameter defined in step 402. As shown in FIG. 9, step 410 may begin with the input from arrow 809 from step 408. Arrow 809 may represent the extended-life cement composition developed from steps 404, 406, and 408 and may include Portland cement, SCMs, retarders, and viscosifiers and/or dispersants, for example. In step 902, the extended-life cement composition may be prepared at the density specified by the engineering parameters from step 402 and the resultant slurry may be introduced into an ultrasonic cement analyzer or other apparatus capable of measuring thickening time and compressive strength at the temperature and pressure specified in the engineering parameters from step 402. The prepared cement slurry may be monitored for thickening time and compressive strength at the conditions specified by the engineering parameters from step 402. In step 904, the results of the UCA test or equivalent test may be compared to the engineering parameters from step 402. If the thickening time and compressive strength requirements are met, no activator may be required as the prepared slurry can set with temperature alone and the method may proceed to step 412 as indicated by arrow 905. Alternatively, if the test in step 904 indicates the thickening time is too short, a retarder may be required to be added and the method may be returned to step 406 to select the retarder. Further, if the thickening time is too long, an activator may be required to be added to the extended-life cement composition. The method may progress to step 906 as indicated by arrow 907. In step 906, an activator and concentration thereof may be selected and the method may return to step 902 as shown by arrow 908. The selection of activator may be based at least in part on temperature and reactivity of the activator. A cement slurry may be prepared and tested according to the method above until a thickening time is achieved that is within the specification of step 402.

With further reference to FIG. 4, after the step of selecting an activator and concentration thereof in step 410, the method may proceed to step 412 whereby the compressive strength of the cement composition may be verified by destructive or non-destructive means. An extended life cement composition may be prepared based on the results of steps 404, 406, 408, and 410 and may include Portland cement, SCMs, retarders, viscosifiers and/or dispersants, and a retarder for example. The extended-life cement composition may be prepared with sufficient water to reach the density defined in step 402. The cement composition may be cured at the temperature and pressure specified by step 402 and thereafter be subjected to compressive strength testing such as unconfined compressive strength testing. If a result of the compressive strength test indicates that the compressive strength is lower than required as set out in step 402, the method may return to step 406 to select another retarder or a concentration of retarder or the method may return to step 410 to select and/or increase a concentration of accelerator. Alternatively, the method may return to step 402 to select a higher concentration of Portland cement or to select a more reactive Portland cement.

As discussed above, the using the extended-life cement slurry is two part, storing and pumping. To produce an extended-life cement slurry that will remain in a pumpable fluid state during the storage phase and still set with the desired physical properties, the correct retarder and concentration thereof should be selected. Similarly, if an activator is required such that the extended-life cement slurry will set with the desired physical properties, the correct cement accelerator and concentration thereof should be selected. As previously mentioned, there may be differences in material availability across geographic regions which may limit the material availability to produce an extended-life cement slurry. The methods described herein may allow for various cement activators and retarders to be utilized and the correct retarder for a particular cementing operation may be dependent upon the material availability in the geographic area where the cementing operation occurs.

The thickening time for an extended-life cement slurry, in general, may be the solution to integral Equation 1. The thickening time for an extended-life cement slurry is not the same as a thickening time for a conventional Portland cement slurry or as conventional Portland cement slurries do not have a storage time. As discussed above, the set time of a Portland cement slurry can only be extended for a relatively short time before the physical properties of the set Portland cement do not meet engineering requirements. Adding additional cement retarder to a conventional Portland cement slurry does not produce a cement which can be extended for the same periods of time as an extended-life cement slurry while still meeting engineering requirements.

$$1 = \int_0^t \frac{dt}{TT(T(t), P(t), \rho_S(t), c_{bl}, R)} \quad \text{Equation 1}$$

Where the time t which satisfies the above equation is the thickening time of a cement slurry under the given conditions of temperature T and pressure P. The thickening time TT may be a function of several parameters including time dependent temperature T(t), time dependent pressure P(t), density $\rho_s(t)$, blend composition $C_{bl}$, and retarder package R and its concentration. There may be several equivalent forms of Equation 1.

The thickening time of an extended-life cement slurry may be considered as two distinct regimes. The first regime is during the storage step also referred to herein as storage time where the extended-life cement slurry is kept at a surface location and the rate of cementitious reactions in the extended-life cement slurry are relatively slow. The second regime is the pumping step where the extended-life cement slurry is exposed to wellbore temperatures, mixed with an accelerator, or both. In the second regime the rate of thickening may be increased relative to the first regime due to elevated temperatures and/or the accelerator.

One form of the denominator of Equation 1 may be Equation 2 shown below.

$$TT(T(t), P(t), \rho_s(t), c_{bl}, R) = $$
$$TT_0 \exp\left(-\frac{E_{eff,TT}}{R}\left(\frac{1}{T_{ref}} - \frac{1}{T(t)}\right)\right) \exp\left(-\frac{VP(t)}{RT_{ref}}\right) \exp(\alpha_a[R])\left(\frac{W}{C}\right)^n$$

Where W is the amount of water, C is the amount of cement, $TT_0$ is thickening time of pure Portland cement at a desired temperature when $$\frac{water}{Portland} = 1,$$

$E_{eff,TT}$ is the effective activation energy of the blend which describes the sensitivity to temperature changes, R is the gas constant, $T_{ref}$ is the reference temperature where effective activation energy is measured or calculated at, T is temperature, t is time, V is the activation volume, $\alpha$ is the potency of the retarder, and n is a constant for a given extended-life cement composition.

The activation energy, activation volume, and n may be dependent upon the composition of the n the extended-life cement slurry and the potency of the retarder depends upon the chemical identity of the retarder and concentration thereof. While a relatively stronger cement retarder may provide more aggressive retarding, a stronger cement retarder may not translate to a more rheologically constant extended-life cement slurry. In some examples, a relatively less potent cement retarder at a relatively lower loading may provide better rheological properties as well as satisfy the thickening time requirement.

In some examples, an activator may be used during the pumping step to activate the extended-life cement slurry such that the extended-life cement slurry may set with the desired physical properties. In examples where a retarder and activator are used, the denominator of equation 1 may be in the form of Equation 3 shown below.

$$TT(T(t), P(t), \rho_s(t), c_{bl}, R) = TT_0 \exp\left(-\frac{E_{eff,TT}}{R}\left(\frac{1}{T_{ref}} - \frac{1}{T(t)}\right)\right) \quad \text{Equation 3}$$
$$\exp\left(-\frac{VP(t)}{RT_{ref}}\right) \exp(\alpha[R(t)])\left(\frac{W}{C}\right)^n \exp(\alpha_a[A(t)])$$

Where W is the amount of water, C is the amount of cement, $TT_0$ is thickening time of pure Portland cement at a desired temperature when $$\frac{water}{Portland} = 1,$$

$E_{eff,TT}$ is the effective activation energy of the blend which describes the sensitivity to temperature changes, R is the gas constant, $T_{ref}$ is the reference temperature where effective activation energy is measured or calculated at, T is temperature, t is time, V is the activation volume, and a is the potency of the retarder, $\alpha_a$ is the potency of the activator, R(t) is the concentration of the retarder as a function of time, A (t) is the concentration of the activator as a function of time, and n is a constant for a given extended-life cement composition.

Figure 10:
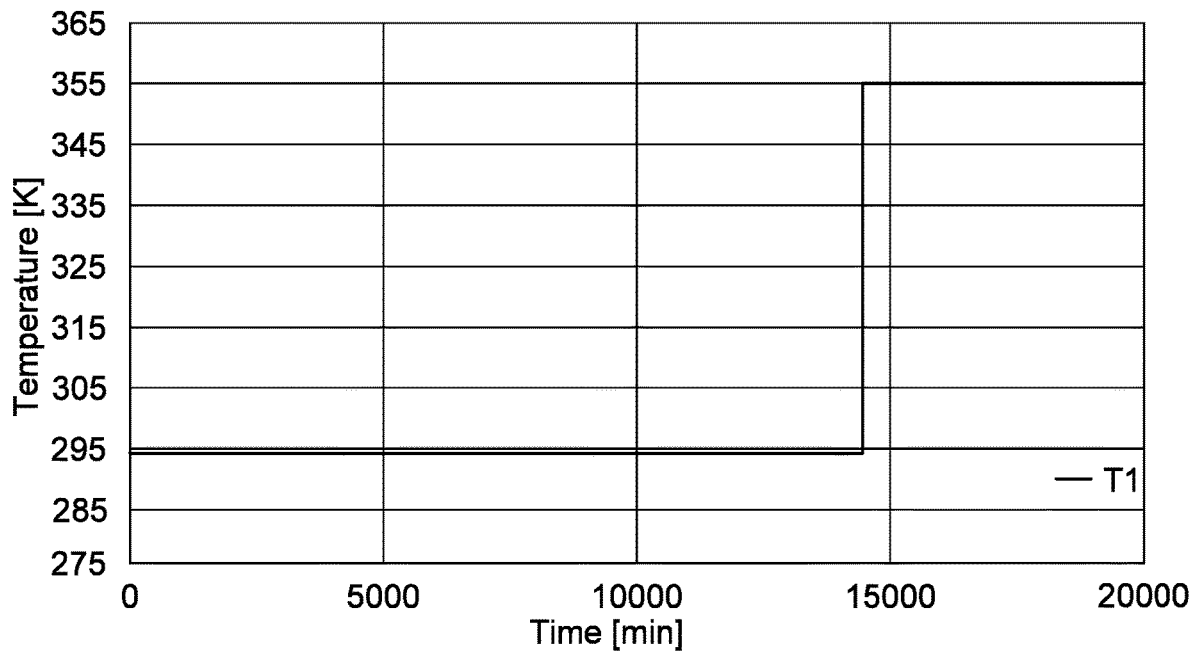
FIG. 10 is an example graph of an example temperature profile.

The use of equations 2 and 3 will now be described in several examples. Assume that the extended-life cement slurry is required to remain in a pumpable fluid state for 10 days at a temperature of 70° F. (294 K). After 10 days, the extended-life cement slurry is to be numbed into a wellbore with a bottom hole circulating temperature (BHCT) of 180° F. (355 K). The temperature profile for such an example is shown in FIG. 10. Further assume that the properties of the extended-life cement slurry are those shown in Table 1.

TABLE 1

| Parameter | Value | Units |
|---|---|---|
| TT0 | 500 | min |
| E/R | −2000 | 1/K |
| Tref | 322 | K |
| W/C | 0.56 | |
| n | 1.5 | |
| V | −5.00E−07 | m^3 |
| Pressure | 2.07E+07 | Pa |

Calculating the storage time of an extended-life cement slurry without retarder or accelerator with the properties of Table 1 using Equation 1 and Equation 2 yields a thickening time of about 1200 minutes at 70° F. after which the extended-life cement slurry will begin to thicken. For the extended-life cement slurry to be stored for 10 days a retarder will be required. Without a model such as Equation 2 and Equation 3, the selection of a retarder and concentration thereof may require several laboratory tests lasting the full 10 days. If it is assumed that the potency of the retarder ($\alpha$) is 2% bwoc$^{-1}$, a graph of retarder concentration versus thickening time may be generated.

Figure 11:
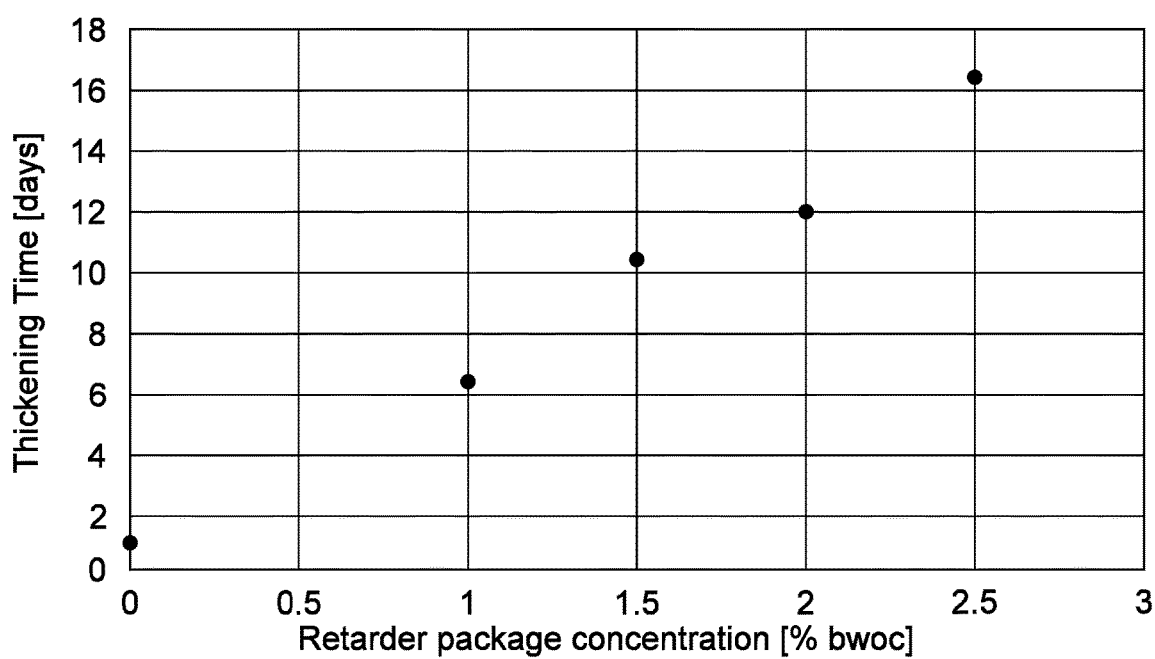
FIG. 11 is an example graph of retarder concentration versus thickening time.

FIG. 11 is a graph of retarder concentration versus thickening time. It can be observed that a concentration of about 1.5% by weight of cement (bwoc) is required to provide the thickening time of 10 days. In some examples, the thickening time may be extended further, for example to about 12 days, and an activator may be mixed with the extended-life cement slurry prior to pumping the extended-life cement slurry into the wellbore.

Figure 12:
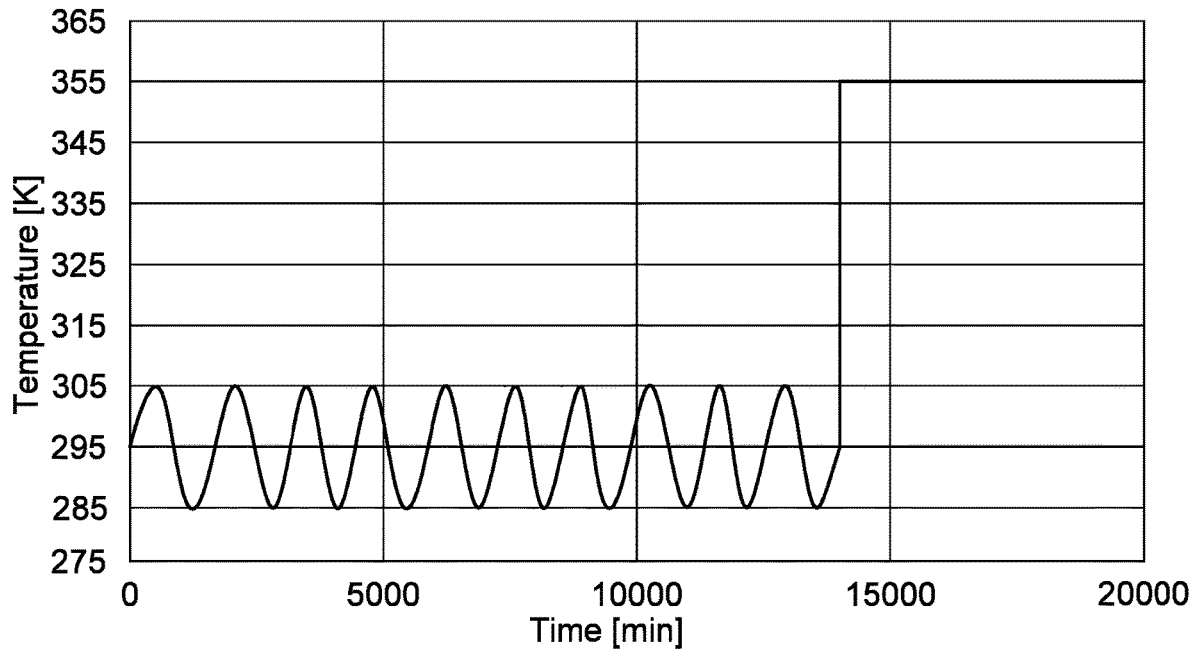
FIG. 12 is an example graph of a fluctuating temperature profile.
Figure 13:
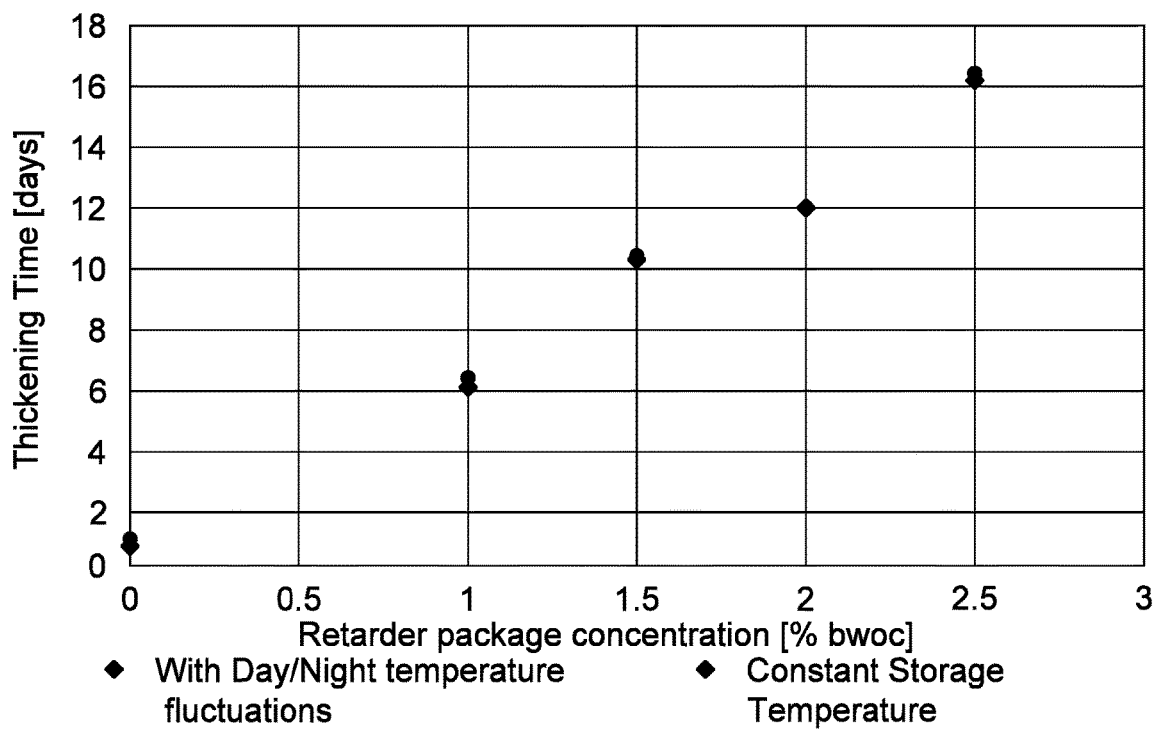
FIG. 13 is an example graph of retarder concentration versus thickening time.

The previous example was the simple case where a constant storage temperature is assumed to be constant. However, the storage temperature is generally not constant at well pads and the extended-life cement slurry may undergo daily fluctuations based on weather. If the assumption is made that the daily high temperature is 88° F. (304 K) and the daily low temperature is 53° F. (284 K) and the extended-life cement is required to be stored for 10 days then FIG. 12 is a graph of the temperature profile under these conditions. If the extended-life cement is assumed to have the same properties shown in table 1 with the potency of the retarder ($\alpha$) is 2% bwoc$^{-1}$, it can be observed that the storage time of 10 days may be achieved with a retarder concentration of about 1.5 bwoc. Thus, for these conditions, the effect of temperature fluctuations is not significant. FIG. 13 is a graph of the thickening time of the extended-life cement slurry with constant temperature and daily temperature fluctuations.

Figure 14:
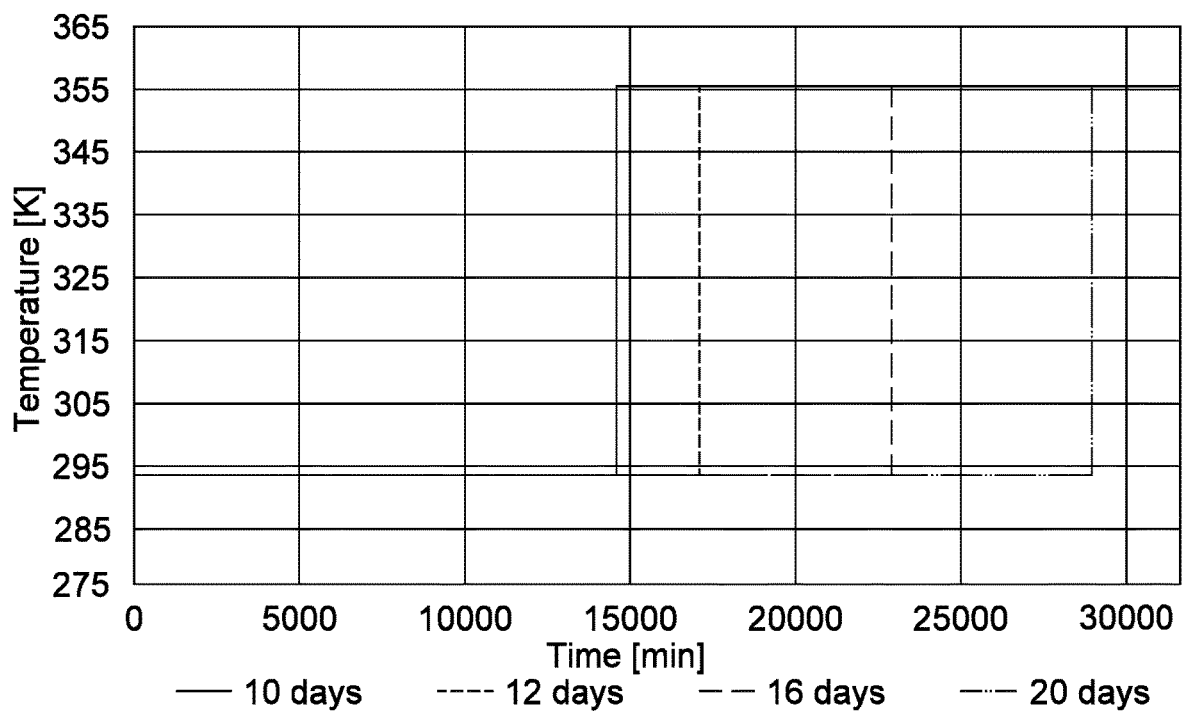
FIG. 14 is an example graph of an effective temperature profile.
Figure 15:
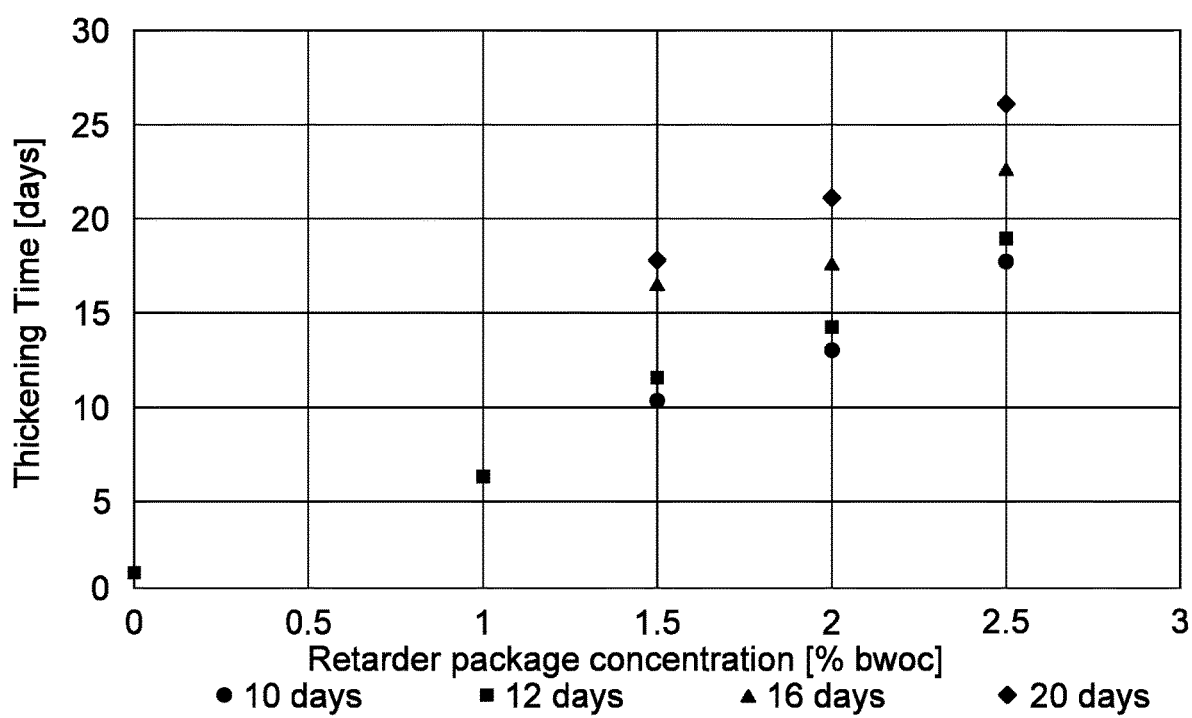
FIG. 15 is an example graph of retarder concentration versus thickening time.

In another example, the exact storage time of the extended-life cement slurry may not be completely predetermined. For example, a requirement may be that the extended-life cement slurry be stored for a period of 10 days to 20 days. The extended-life cement slurry may be pumped after 10 days in storage up to 20 days in storage, or any time therebetween. FIG. 14 is a graph showing the temperature profile of this scenario where the extended-life cement slurry is pumped at 10 days, 12, days, 16 days, and 20 days. FIG. 15 is a graph of retarder concentration versus thickening time for the extended-life cement slurry stored at 10 days, 12, days, 16 days, and 20 days. Equation 2 were used to generate FIG. 15. It can be observed that a loading of 1.5% bwoc retarder allows for approximately 10 to approximately 17 days of storage, a loading of 2.0% bwoc retarder allows for approximately 12 to approximately 22 days of storage, and a loading of 2.5% bwoc allows for approximately 16 to approximately 26 days of storage. As such, for a storage time from 10 to 16 days, a retarder concentration of 1.5% bwoc is predicted to be sufficient whereas a storage up to 20 days would require about 2.0% bwoc retarder. Thus, for the requirement of 10 days to 20 days the retarder should be selected to be about 2.0% bwoc.

As mentioned above, some examples of the extended-life cement slurry may include a cement activator. A cement activator may counteract the retarding effects of the cement retarder and allow the extended-life cement slurry to set to form a hardened mass in a shorter time period than an extended-life cement slurry which does not contain a cement set activator. In the example above where the extended-life cement slurry is designed for a storage time of 10 to 20 days and the retarder concentration is selected to be 2.0% bwoc, the extended-life cement slurry may have a limited range of days where the extended-life cement slurry may be pumped to form a set cement in a reasonable amount of time. For example, if the extended-life cement slurry is designed for a storage time of 10 to 20 with a 2.0% bwoc as above and the extended-life cement slurry need to be pumped at 16 days, it would take approximately 1.7 days according to FIG. 14 for the extended-life cement slurry to become unpumpable. During the 1.7 days the extended-life cement slurry is setting, further wellbore processes are generally not allowed to be performed to not disrupt the setting of the cement slurry. The non-productive time waiting for cement to set is often called wait on cement (WOT). To counteract the additional time required from pumping the extended-life cement slurry into the wellbore, an activator may be added to the extended-life cement slurry.

Figure 16:
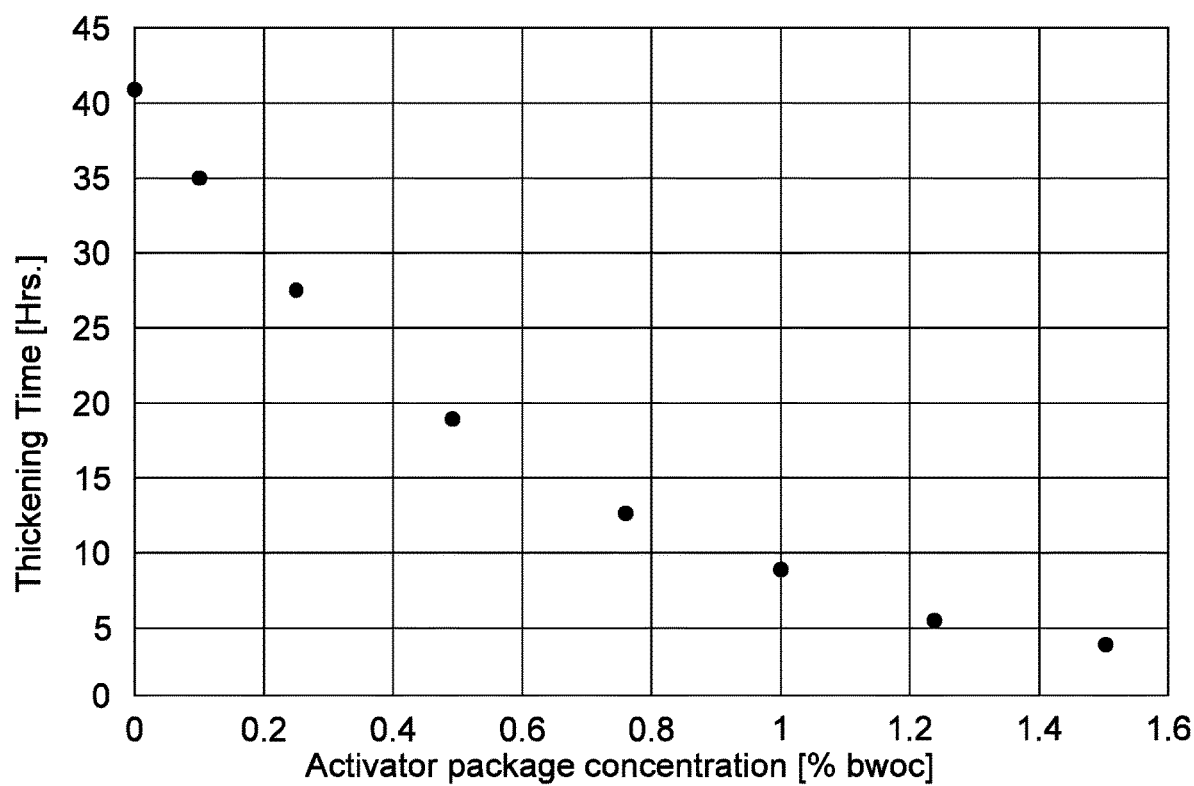
FIG. 16 is an example graph of activator concentration versus thickening time.

Assuming the potency of the activator $\alpha_a$ is about $-1.5\%$ bwoc$^{-1}$, Equation 1 and Equation 3 may be used to calculate a thickening time as a function of activator concentration. FIG. 16 is a graph of the activator concentration versus thickening time. It can be observed that for about 8 hours of thickening time at the selected BHCT of 180° F. (355 K), the extended-life cement slurry should have about 1% bwoc of the activator added to the extended-life cement slurry after 16 days to achieve the desired thickening time of 8 hours.

While the foregoing discussion has focused on examples where the extended-life cement slurry parameters of Table 1 are assumed to be constant, there may be instances where the extended-life cement slurry parameters are time dependent and/or dependent upon agitation or shear during storage. However, any time dependency or shear dependency of extended-life cement slurry parameters may be readily accounted for by testing the extended-life cement slurry in laboratory conditions to determine any time dependent or shear dependent parameters.

Figure 17:
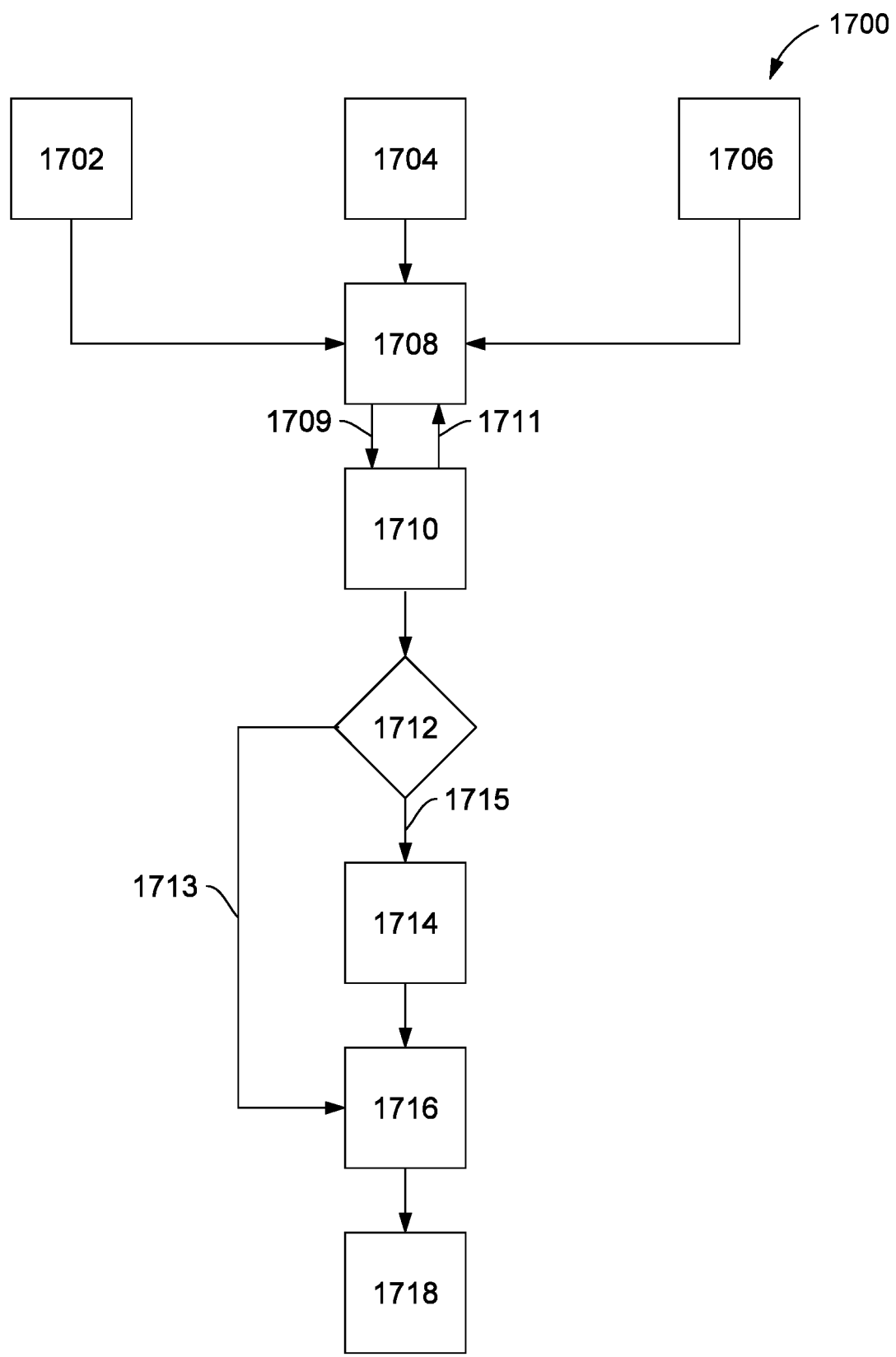
FIG. 17 is a flowchart illustrating an example method for designing an extended-life cement composition.

The discussion will now be drawn to model-based approach utilizing a cement optimization model. FIG. 17 illustrates method 1700 for preparing an extended-life cement composition using a cement optimization model. Method 1700 may begin with step 1702, step 1704, and step 1706. In step 1702, engineering parameters such as a target lime to silica ratio or target lime requirement as well as compressive/tensile strength requirements may be defined. In step 1704, process conditions such as wellbore temperature, storage temperature, required storage time, and cement density may be specified. In step 1706, bulk material availability may be defined. Bulk material availability may include compositional analysis of the bulk materials such as lime content and mineral content. The results of step 1702, step 1704, and step 1706 may be input into step 1708 where the results of each of step 1702, step 1704, and step 1706 are used in a cement optimization model. The cement optimization model will be described in detail below. An output from step 1708 may include an extended-life cement composition which contains components selected from the bulk material availability defined in step 1706. Bulk materials may include any materials described above, including cement components, supplementary cementitious components, and cement additives. The extended-life cement composition from step 1708 may be used as an input to step 1710 as indicated by arrow 1709. In step 1710, a storage time model may be utilized which predicts the amount of time which the extended-life cement composition from step 1708 can be stored in a pumpable fluid state. The storage time model will be discussed in detail below. If the predicted storage time from step 1710 does not meet or exceed the required storage time defined in step 1704, the method may proceed back to step 1708 as shown by arrow 1711 such that a new extended-life cement composition may be generated. Step 1708 of generating an extended-life cement composition and step 1710 of predicting the amount of time the extended-life cement composition may be stored in a pumpable fluid state may be iteratively performed until an extended-life cement composition is generated which meets the required storage time or it is determined that a cement retarder is required to meet the required storage time.

Method 1700 may proceed to decision 1712 where the predicted storage time of the extended-life cement composition may be compared to the required storage time defined in step 1704. If the predicted storage time meets or exceeds the required storage time, the method may proceed via arrow 1713 to step 1716. If the predicted storage time is less than the required storage time, the method may proceed to step 1714 where a cement retarder and concentration thereof may be selected. In step 1714 the storage time model may be used to predict the storage time for an extended-life cement composition which includes the selected cement retarder. As there may be several cement retarders available as a bulk material defined in step 1706, there may be several cement retarders which may result in an extended life cement composition with the required storage time. Additional constraints may be applied to selecting a cement retarder and concentration thereof such as maximum allowable concentration or constraints related to material compatibility, for example. The step of selecting a cement retarder may be iteratively performed such that an extended life cement composition with the required storage time may be generated within the additional constraints. After an extended life cement composition with the required storage time is generated, method 1700 may proceed to step 1716.

In step 1716, the extended life cement composition may be prepared by mixing the components of the extended life cement composition selected in step 1708 and cement retarder from step 1714, if present, to form an extended life cement slurry. The extended life cement slurry subjected to testing to determine that the extended life cement composition meets or exceeds the engineering parameters defined in step 1702 including, for example, the required storage time. Other test may include ultrasonic cement testing, thickening time tests, flowability tests as different time intervals (e.g. 10 seconds, 10 minutes, 30 minutes, 24 hours, or greater), rheology testing, and tests to determine the frictional gradient, for example. In examples where the frictional gradient does not meet the rheological hierarchy requirements, method 1700 may proceed to step 1718 whereby a viscosifier or a dispersing agent and concentration thereof may be selected such that the rheological hierarchy requirements are satisfied. An output from step 1718 is the recommended extended-life cement composition.

The cement optimization model previously mentioned will now be described in detail. The cement optimization model may have an objective function described by: Max$_{Blend\ Composition}$ (Storage Time) with the constraints of CS≥Target CS and Lime Content≥Target Lime Content. As such, the optimization of storage time may be achieved by modifying the blend composition while abiding by the constraints of compressive strength and lime content. The cement optimization model may calculate properties at a density and temperature conditions which are relevant, such as the cement density and storage temperature selected in step 1004. In some examples, the cement optimization model may be evaluated at storage temperature and the compressive strength model may be evaluated at wellbore temperature. The cement optimization model may include a compressive strength model and a storage time model.

In some examples, the compressive strength model may have the form of Equation 4, $$CS = CS_0\left(\frac{\text{water}}{\sum_i \alpha_i m_i}\right)^n \exp\left(-\frac{E_{\mathit{eff,UCA}}}{R'}\left(\frac{1}{T_{\mathit{ref}}} - \frac{1}{T}\right)\right) \quad \text{Equation 4}$$

Where $CS_0$ is the compressive strength of the Portland cement at a desired temperature when $$\frac{\text{water}}{\text{Portland}} = 1,$$

water is me mass fraction of water in the extended-life cement composition, $\alpha_i$ is a constant that characterizes reactivity of blend material i in the extended-life cement composition, $m_i$ is the mass fraction of component i in the extended-life cement composition, n is a measure of sensitivity to change in water content, $E_{\mathit{eff,TT}}$ is the effective activation energy of the blend which describes the sensitivity to temperature changes, R is the gas constant, $T_{\mathit{ref}}$ is the reference temperature where effective activation energy is measured or calculated at, and T is temperature. $E_{\mathit{eff,TT}}$ may be calculated as a weighted or volumetric average of activation energies for individual blend materials. N may be determined by preparing two cement compositions with different amounts of water and using equation 4 to calculate n.

A method of using Equation 4 may be in step 1008. After defining the compressive strength requirement in step 1002 and process conditions in step 1004, the output of steps 1002 and 1004 may be input to Equation 4. Equation 4 may be iterated by selecting components and mass fractions thereof from the bulk material availability defined in step 1006 and calculating the predicted compressive strength. Step 1006 may also include defining activation energies of the bulk material availability to allow for calculations of $E_{\mathit{eff,TT}}$. If the predicted compressive strength of an extended-life cement composition as calculated by Equation 4 meets or exceeds the required compressive strength, the extended-life cement composition may be used as an input to a storage time model described by Equation 5 below. However, if the extended-life cement composition as calculated by Equation 4 does not meet or exceeds the required compressive strength, the concentration of one or more components of the extended-life cement composition may be adjusted to generate a new extended-life cement composition. The compressive strength of the new extended-life cement composition may be calculated and compared to the required compressive strength. The process of selecting components and mass fractions thereof may be continued until an extended-life cement composition that meets the required compressive strength.

In some examples, the storage time model may have the form of Equation 5, $$\text{Storage Time} = ST_0\left(\frac{\text{water}}{\text{blend}}\right)^n \sum_i x_i \beta_i \exp\left(-\frac{E_{\mathit{eff,UCA}}}{R}\left(\frac{1}{T_{\mathit{ref}}} - \frac{1}{T}\right)\right) \quad \text{Equation 5}$$

Where the material constant $ST_0$ is the storage time of pure Portland cement at a desired temperature when $$\frac{\text{water}}{\text{Portland}} = 1, \frac{\text{water}}{\text{blend}}$$

is the ratio of masses of water and cement components in the cement blend, n is a measure of sensitivity to change in water content, xi is the mass fraction of component i in the cement blend, $\beta_i$ is a constant which characterizes the reactivity of component i, $E_{\mathit{eff,UCA}}$ is the effective activation energy of the blend which describes the sensitivity to temperature changes, R is the gas constant, $T_{\mathit{ref}}$ is the reference temperature where effective activation energy is measured or calculated at, and T is temperature. $E_{\mathit{eff,UCA}}$ may be calculated as a weighted or volumetric average of activation energies for individual blend materials. The constant $\beta_i$ may be set to 1 for pure Portland cement but for other materials the value of $\beta_i$ may be determined experimentally.

A method of using Equation 5 may be in step 1010 and decision 1012. The extended-life cement composition from Equation 4 which meets the compressive strength requirement may be input into Equation 5 along with the storage temperature defined in step 1002 and a predicted storage time may be calculated. If the predicted storage time meets or exceeds the required storage time, the method may proceed to decision 1012 as described above. However, if the predicted storage time does not meet or exceed the required storage time, the method may proceed back to step 1008 where Equation 4 may be utilized to generate a new extended-life cement composition. The process of generating the extended-life cement composition and calculating a predicted storage time may be repeated until a storage time is achieved that meets or exceeds the required storage time is achieved.

While the above equations may allow the storage time and compressive strength of a cement composition to be predicted, the storage time requirement set forth in step 1002 may not be achievable without a cement additive such as a cement retarder. A storage time requirement may be on the order of a few days to a few weeks, and in such examples, a cement retarder or other retarding additive may be used in the cement blend to achieve an extended storage time as required. A cement retarder may be selected to be included in the extended-life cement composition based on the required storage time and dispersion effects of the cement retarder, for example. To select a cement retarder a storage time model for cement additives may be utilized such as those described in Equations 1 and 2. A method of using Equations 1 and 2 may be in step 1014. The extended-life cement composition generated in Equation 4 may be input into Equation equations 1 and 2 and a retarder and concentration thereof may be selected from the bulk material availability defined in step 1006. The storage time of the extended-life cement composition including the cement retarder may be calculated using equations 1 and 2 which may then be compared to the required storage time. If the storage time meets or exceeds the required storage time, the method may proceed to step 1016 as described above. However, if the storage time of the extended-life cement composition including the cement retarder does not meet the required storage time, equations 1 and 2 may be used to an additional or separate retarder and concentration thereof. Storage time of the extended-life cement composition including an additional or separate retarder may then be calculated and compared to the required storage time. The process of iterating equations 1 and 2 may be continued until an extended-life cement composition with the required storage time is achieved.

Figure 18:
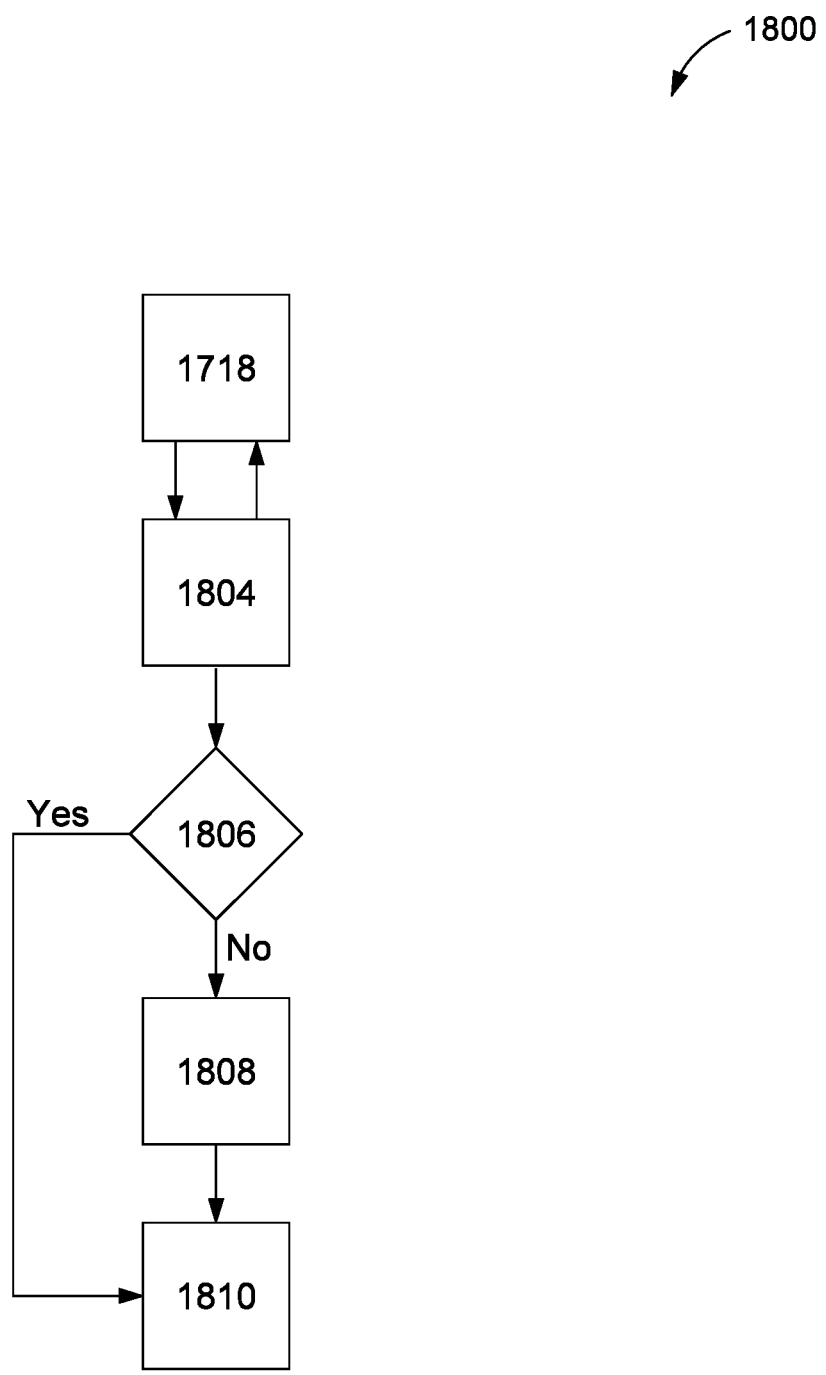
FIG. 18 is a flowchart illustrating an example method for selecting an activator or cement retarder.

FIG. 18 illustrates a method 1800 to determine if an activator or retarder is required to be included in the extended-life cement composition. Method 1800 may begin with the output of method 1700, the recommended extended-life cement composition 1718. In step 1804, a thickening time model may be used to calculate the thickening time of the recommended extended-life cement composition. At decision 1806, the calculated thickening time may be compared to the required thickening time defined in step 1702. If it is determined that the calculated thickening time is within tolerance of the required thickening time, method 1800 may proceed to step 1810. If the calculated thickening time is outside the spec of the required thickening time method 1100 may proceed to step 1808 where an activator or retarder may be selected from the bulk material availability defined in step 1706.

An example method of using Equation 3 may be in step 1804. The recommended extended-life cement composition may be utilized with Equation 3 to calculate the thickening time of the recommended extended-life cement composition. If the thickening time is within tolerance of the required thickening time, the recommended extended-life cement composition may be used in a cementing operation. If the thickening time is not within tolerance of the required thickening time because the thickening time is too long or too short, an activator or retarder may be selected in step 1808. In step 1808, an activator and a concentration thereof may be selected if the thickening time is too short and an activator may be selected if the thickening time is too long. Equations 2 and 3 may be used by selecting a retarder or activator and a concentration thereof and calculating the thickening time of the recommended extended-life cement composition including the retarder or activator. If the recommended extended-life cement composition including the retarder or activator is within tolerance of the required thickening time, the method may proceed to step 1810 where the recommended extended-life cement composition is prepared and pumped into a wellbore. If the recommended extended-life cement composition including the retarder or activator is not within tolerance of the required thickening time, Equation 3 may be iterated by increasing the concentration of the selected retarder or activator, selecting an additional or separate retarder or activator and concentration thereof. Thickening time of the extended-life cement composition including an additional or separate retarder or activator may then be calculated and compared to the required thickening time. The process of iterating Equation 3 may be continued until an extended-life cement composition with the required thickening time is achieved.

Examples of the extended-life cement compositions may be used in a variety of subterranean operations, including primary and remedial cementing. In some embodiments, an extended-life cement composition may be provided that includes hydraulic cement, a supplementary cementitious material, a retarder, and water. The extended-life cement composition may be prepared according to any method disclosed herein such that the extended-life cement composition has the property of being able to remain in a pumpable fluid state for an extended period of time. An activator may be included in the extended-life cement composition such that the extended-life cement composition may set. In examples, the extended-life cement composition may be introduced into a subterranean formation and allowed to set therein. As used herein, introducing the extended-life cement composition into a subterranean formation includes introduction into any portion of the subterranean formation, including, without limitation, into a wellbore drilled into the subterranean formation, into a near wellbore region surrounding the wellbore, or into both. Embodiments may further include activation of the extended-life cement composition. The activation of the extended-life cement composition may include, for example, the addition of a cement set activator to the extended-life cement composition.

In some examples, an extended-life cement composition may be provided that includes hydraulic cement, a supplementary cementitious material, a retarder, and water. The extended-life cement composition may be prepared according to any method disclosed herein such that the extended-life cement composition has the property of being able to remain in a pumpable fluid state for an extended period of time. The extended-life cement composition may be stored, for example, in a vessel or other suitable container. The extended-life cement composition may be permitted to remain in storage for a desired time period. For example, the extended-life cement composition may remain in storage for a time period of about 1 day or longer. For example, the extended-life cement composition may remain in storage for a time period of about 1 day, about 2 days, about 5 days, about 7 days, about 10 days, about 20 days, about 30 days, about 40 days, about 50 days, about 60 days, or longer. In some embodiments, the extended-life cement composition may remain in storage for a time period in a range of from about 1 day to about 7 days or longer. Thereafter, the extended-life cement composition may be activated, for example, by addition of a cement set activator and subsequently introduced into a subterranean formation, and allowed to set therein.

In primary cementing embodiments, for example, the extended-life cement composition may be introduced into an annular space between a conduit located in a wellbore and the walls of a wellbore (and/or a larger conduit in the wellbore), wherein the wellbore penetrates the subterranean formation. The extended-life cement composition may be allowed to set in the annular space to form an annular sheath of hardened cement. The extended-life cement composition may form a barrier that prevents the migration of fluids in the wellbore. The extended-life cement composition may also, for example, support the conduit in the wellbore.

In remedial cementing embodiments, an extended-life cement composition may be used, for example, in squeeze-cementing operations or in the placement of cement plugs. By way of example, the extended-life composition may be placed in a wellbore to plug an opening (e.g., a void or crack) in the formation, in a gravel pack, in the conduit, in the cement sheath, and/or between the cement sheath and the conduit (e.g., a micro annulus).

An embodiment includes a method of cementing in a subterranean formation comprising: providing a cement composition including hydraulic cement, a supplementary cementitious material, a retarder, and water. The extended-life cement composition may be prepared according to any method disclosed herein such that the extended-life cement composition has the property of being able to remain in a pumpable fluid state for an extended period of time. The extended-life cement composition may then be introduced into the subterranean formation; and allowed set in the subterranean formation. The components of the cement composition including the selection of components are described in more detail in connection with the embodiments discussed above. The cement composition may be extended-life as described in the embodiments discussed above. Cement set activators such as those described previously may be used for activation of the cement composition.

The exemplary extended-life cement compositions disclosed herein may directly or indirectly affect one or more components or pieces of equipment associated with the preparation, delivery, recapture, recycling, reuse, and/or disposal of the disclosed extended-life cement compositions. For example, the disclosed extended-life cement compositions may directly or indirectly affect one or more mixers, related mixing equipment, mud pits, storage facilities or units, composition separators, heat exchangers, sensors, gauges, pumps, compressors, and the like used generate, store, monitor, regulate, and/or recondition the exemplary extended-life cement compositions. The disclosed extended-life cement compositions may also directly or indirectly affect any transport or delivery equipment used to convey the extended-life cement compositions to a well site or downhole such as, for example, any transport vessels, conduits, pipelines, trucks, tubulars, and/or pipes used to compositionally move the extended-life cement compositions from one location to another, any pumps, compressors, or motors (e.g., topside or downhole) used to drive the extended-life cement compositions into motion, any valves or related joints used to regulate the pressure or flow rate of the extended-life cement compositions, and any sensors (i.e., pressure and temperature), gauges, and/or combinations thereof, and the like. The disclosed extended-life cement compositions may also directly or indirectly affect the various downhole equipment and tools that may come into contact with the extended-life cement compositions such as, but not limited to, wellbore casing, wellbore liner, completion string, insert strings, drill string, coiled tubing, slick line, wireline, drill pipe, drill collars, mud motors, downhole motors and/or pumps, cement pumps, surface-mounted motors and/or pumps, centralizers, turbolizers, scratchers, floats (e.g., shoes, collars, valves, etc.), logging tools and related telemetry equipment, actuators (e.g., electromechanical devices, hydro mechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like.

Accordingly, the present disclosure may provide methods, systems, and apparatus that may relate to methods of designing extended life cement compositions. The methods, systems. And apparatus may include any of the various features disclosed herein, including one or more of the following statements.

Statement 1. A method of preparing a cement comprising: (a) defining engineering parameters of a proposed cement slurry, wherein the engineering parameters comprise at least a density requirement, a compressive strength requirement, and a storage time requirement; (b) selecting at least a cement and mass fraction thereof, at least one supplementary cementitious material and mass fraction thereof, and a water and mass fraction thereof, such that a cement slurry formed from the cement, the at least one supplementary cementitious material, and the water meet or exceed the density requirement; (c) calculating a compressive strength of the cement slurry; (d) comparing the compressive strength of the cement slurry to the compressive strength requirement and repeating steps (b)-(d) if the compressive strength does not meet or exceed the compressive strength requirement, or performing step(e) if the compressive strength meets or exceeds the required compressive strength; (e) selecting a cement retarder and mass fraction thereof based at least in part on a thickening time model and the storage time requirement; and (f) preparing the cement slurry comprising the cement and mass fraction thereof, the at least one supplementary cementitious material and mass fraction thereof, the water and mass fraction thereof, and the cement retarder and mass fraction thereof.

Statement 2. The method of statement 1 wherein the cement is selected from the group consisting of Portland cements, pozzolana cements, gypsum cements, high alumina content cements, silica cements, and combinations thereof.

Statement 3. The method of any of statements 1-2 wherein the at least one supplementary cementitious material is selected from the group consisting of fly ash, blast furnace slag, silica fume, pozzolans, kiln dust, clays, and combinations thereof.

Statement 4. The method of any of statements 1-3 wherein the engineering parameters further comprise wellbore temperature, a lime to silica ratio requirement, and wherein the step of selecting a cement and mass fraction thereof and at least one supplementary cementitious material and mass fraction thereof comprises: selecting a first cement based at least in part on the wellbore temperature and a cement reactivity trend, wherein the cement reactivity trend comprises a correlation of cement reactivity with temperature; selecting at least a first supplementary cementitious material based at least in part on wellbore temperature, supplementary cementitious material reactivity, temperature sensitivity of reactivity, and water requirement of supplementary cementitious material; and calculating a silica content and a lime content for each of the first cement and the at least the first supplementary cementitious material and determining an additional amount of lime required to meet the lime to silica ratio requirement.

Statement 5. The method of any of statements 1-4 wherein the engineering parameters further comprise temperature, and wherein the thickening time model comprises the following integral equation:

$$1 = \int_0^t \frac{dt}{TT_0 \exp\left(-\frac{E_{eff,TT}}{R}\left(\frac{1}{T_{ref}} - \frac{1}{T(t)}\right)\right)} \exp\left(-\frac{VP(t)}{RT_{ref}}\right) \exp(\alpha[R(t)])\left(\frac{W}{C}\right)^n \exp(\alpha_a[A(t)])$$

where W is the amount of water, C is the amount of cement, $TT_0$ is a thickening time of pure Portland cement at a desired temperature when $$\frac{water}{Portland} = 1,$$

$E_{eff,TT}$ is an effective activation energy of the cement slurry which describes the sensitivity to temperature changes, R is the gas constant, $T_{ref}$ is a reference temperature where effective activation energy is measured or calculated at, T is temperature, t is time, V is an activation volume, α is a potency of the cement retarder, and n is a constant.

Statement 6. The method of statement 5 wherein the cement retarder and mass fraction thereof are selected such that t=the storage time requirement solves the integral equation.

Statement 7. The method of statement 5 wherein the storage time requirement is about 1 day to about 30 days.

Statement 8. The method of any of statements 1-7 wherein the engineering parameters further comprises a thickening time requirement, and wherein the method further comprises selecting an activator and mass fraction thereof based at least in part on an activator thickening time model and the thickening time requirement.

Statement 9. The method of statement 8 wherein the activator thickening time model comprises the following integral equation:

$$1 = \int_0^t \frac{dt}{TT_0 \exp\left(-\frac{E_{eff,TT}}{R}\left(\frac{1}{T_{ref}} - \frac{1}{T(t)}\right)\right)} \exp\left(-\frac{VP(t)}{RT_{ref}}\right) \exp(\alpha[R(t)])\left(\frac{W}{C}\right)^n \exp(\alpha_a[A(t)])$$

where W is the amount of water, C is the amount of cement, $TT_0$ is a thickening time of pure Portland cement at a desired temperature when $$\frac{water}{Portland} = 1,$$

$E_{eff,TT}$ is an effective activation energy of the cement slurry which describes the sensitivity to temperature changes, R is the gas constant, $T_{ref}$ is a reference temperature where effective activation energy is measured or calculated at, T is temperature, t is time, V is an activation volume, α is a potency of the cement retarder, $\alpha_a$ is a potency of the activator, R(t) is a mass fraction of the cement retarder as a function of time, A(t) is a mass fraction of the activator as a function of time, and n is a constant.

Statement 10. A method comprising: defining engineering parameter of a proposed cement slurry, the engineering parameters comprising at least a compressive strength requirement, a density requirement, a storage time requirement, and a thickening time requirement; selecting, based at least in part on a model of compressive strength, a model of storage time, and the density requirement, at least a cement and mass fraction thereof, at least one supplementary cementitious material and mass fraction thereof, and a water and mass fraction thereof, such that a cement slurry formed from the cement, the at least one supplementary cementitious material, and the water meets or exceeds the compressive strength requirement and the density requirement; selecting, based at least in part on a model of thickening time, an accelerator and mass fraction thereof; selecting, based at least in part on a model of activator thickening time, an activator and mass fraction thereof; and preparing a cement slurry comprising the cement and mass fraction thereof, the at least one supplementary cementitious material and mass fraction thereof, the water and mass fraction thereof, and the cement retarder and mass fraction thereof.

Statement 11. The method of statement 10 wherein the cement is selected from the group consisting of Portland cements, pozzolana cements, gypsum cements, high alumina content cements, silica cements, and combinations thereof.

Statement 12. The method of any of statements 10-11 wherein the at least one supplementary cementitious material is selected from the group consisting of fly ash, blast furnace slag, silica fume, pozzolans, kiln dust, clays, and combinations thereof.

Statement 13. The method of any of statements 10-12 wherein the engineering parameters further comprise temperature and wherein the model of compressive strength comprises the following equation:

$$CS = CS_0 \left(\frac{water}{\sum_i a_i m_i}\right)^n \exp\left(-\frac{E_{eff,TT}}{R}\left(\frac{1}{T_{ref}} - \frac{1}{T}\right)\right)$$

where $CS_0$ is the compressive strength of a Portland cement at a desired temperature when $$\frac{water}{Portland} = 1,$$

water is a mass traction of water, $\alpha_i$ is a constant that characterizes reactivity of blend material i, $m_i$ is a mass fraction of component i, n is a measure of sensitivity to change in water content, $E_{\mathit{eff},TT}$ is an effective activation energy, R is the universal gas constant, $T_{ref}$ is a reference temperature where effective activation energy is measured or calculated at, and T is the temperature.

Statement 14. The method of statement 13 wherein the selecting at least a cement and mass fraction thereof, at least one supplementary cementitious material and mass fraction thereof, and a water and mass fraction thereof, comprises: (a) selecting at least a cement and mass fraction thereof, at least one supplementary cementitious material and mass fraction thereof, and a water and mass fraction thereof; (b) calculating a compressive strength of a cement slurry comprising the cement and mass fraction thereof, the at least one supplementary cementitious material and mass fraction thereof, and the water and mass fraction thereof using the model of compressive strength; and (c) comparing the compressive strength of the cement slurry to the compressive strength requirement and repeating steps (a) and (b) if the compressive strength does not meet or exceed the required compressive strength.

Statement 15. The method of statement 14 wherein the engineering parameters further comprise temperature, and wherein the model of thickening time comprises the following integral equation:

$$1 = \int_0^t \frac{dt}{TT_0 \exp\left(-\frac{E_{\mathit{eff},TT}}{R}\left(\frac{1}{T_{ref}} - \frac{1}{T(t)}\right)\right) \exp\left(-\frac{VP(t)}{RT_{ref}}\right) \exp(\alpha[R])\left(\frac{W}{C}\right)^n}$$

where W is the amount of water, C is the amount of cement, $TT_0$ is a thickening time of pure Portland cement at a desired temperature when $$\frac{water}{Portland} = 1,$$

$E_{\mathit{eff},TT}$ is an effective activation energy of the cement slurry which describes the sensitivity to temperature changes, R is the gas constant, $T_{ref}$ is a reference temperature where effective activation energy is measured or calculated at, T is temperature, t is time, V is an activation volume, $\alpha$ is a potency of the cement retarder, and n is a constant.

Statement 16. The method of statement 15 wherein the cement retarder and mass fraction thereof are selected such that t=the storage time requirement solves the integral equation.

Statement 17. The method of statement 15 or 16 wherein the storage time requirement is about 1 day to about 30 days.

Statement 18. The method of any of statements 10-17 wherein the model of activator thickening time comprises the following integral equation:

$$1 = \int_0^t \frac{(dt)}{TT_0 \exp\left(-\frac{E_{\mathit{eff},TT}}{R}\left(\frac{1}{T_{ref}} - \frac{1}{T(t)}\right)\right)} \\ \exp\left(-\frac{VP(t)}{RT_{ref}}\right) \exp(\alpha[R(t)])\left(\frac{W}{C}\right)^n \exp(\alpha_a[A(t)])$$

where W is the amount of water, C is the amount of cement, $TT_0$ is a thickening time of pure Portland cement at a desired temperature when $$\frac{water}{Portland} = 1,$$

$E_{\mathit{eff},TT}$ is an effective activation energy of the cement slurry which describes the sensitivity to temperature changes, R is the gas constant, $T_{ref}$ is a reference temperature where effective activation energy is measured or calculated at, T is temperature, t is time, V is an activation volume, $\alpha$ is a potency of the cement retarder, $\alpha_a$ is a potency of the activator, R(t) is a mass fraction of the cement retarder as a function of time, A(t) is a mass fraction of the activator as a function of time, and n is a constant.

Statement 19. The method of any of statements 10-18 wherein the activator and mass fraction thereof are selected such that t=the thickening time requirement solves the integral equation.

Statement 20. The method of any of statements 10-19 further comprising: storing the cement slurry for a period of time less than or equal to the required storage time; mixing the cement slurry with the accelerator; and introducing the cement slurry into a wellbore.

It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present embodiments are well adapted to attain the ends and advantages mentioned as well as those that are inherent therein. The particular embodiments disclosed above are illustrative only, as the present embodiments may be modified and practiced in different but equivalent manners. Although individual embodiments are discussed, all combinations of each embodiment are contemplated and covered by the disclosure. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative embodiments disclosed above may be altered or modified and all such variations are considered within the scope and spirit of the present disclosure. If there is any conflict in the usages of a word or term in this specification and one or more patent(s) or other documents that may be incorporated herein by reference, the definitions that are consistent with this specification should be adopted.

What is claimed is:

1. A method of preparing a cement comprising:
    (a) defining engineering parameters of a proposed cement slurry, wherein the engineering parameters comprise at least a density requirement, a compressive strength requirement, and a storage time requirement;
    (b) selecting at least a cement and mass fraction thereof, at least one supplementary cementitious material and mass fraction thereof, and a water and mass fraction thereof, such that a cement slurry formed from the cement, the at least one supplementary cementitious material, and the water meet or exceed the density requirement;
    (c) calculating a compressive strength of the cement slurry;
    (d) comparing the compressive strength of the cement slurry to the compressive strength requirement and repeating steps (b)-(d) if the compressive strength does not meet or exceed the compressive strength requirement, or performing step(e) if the compressive strength meets or exceeds the required compressive strength;
    (e) selecting a cement retarder and mass fraction thereof based at least in part on a thickening time model, the storage time requirement, an estimated daily high temperature, and an estimated daily low temperature; and
    (f) preparing the cement slurry comprising the cement and mass fraction thereof, the at least one supplementary cementitious material and mass fraction thereof, the water and mass fraction thereof, and the cement retarder and mass fraction thereof.

2. The method of claim 1 wherein the cement is selected from the group consisting of Portland cements, pozzolana cements, gypsum cements, high alumina content cements, silica cements, and combinations thereof.

3. The method of claim 1 wherein the at least one supplementary cementitious material is selected from the group consisting of fly ash, blast furnace slag, silica fume, pozzolans, kiln dust, clays, and combinations thereof.

4. The method of claim 1 wherein the engineering parameters further comprise wellbore temperature, a lime to silica ratio requirement, and wherein the step of selecting a cement and mass fraction thereof and at least one supplementary cementitious material and mass fraction thereof comprises:
    selecting a first cement based at least in part on the wellbore temperature and a cement reactivity trend, wherein the cement reactivity trend comprises a correlation of cement reactivity with temperature;
    selecting at least a first supplementary cementitious material based at least in part on wellbore temperature, supplementary cementitious material reactivity, temperature sensitivity of reactivity, and water requirement of supplementary cementitious material; and
    calculating a silica content and a lime content for each of the first cement and the at least the first supplementary cementitious material and determining an additional amount of lime required to meet the lime to silica ratio requirement.

5. The method of claim 1 wherein the engineering parameters further comprise temperature, and wherein the thickening time model comprises the following integral equation:

$$1 = \int_0^t \frac{dt}{TT_0 \exp\left(-\frac{E_{eff,TT}}{R}\left(\frac{1}{T_{ref}} - \frac{1}{T(t)}\right)\right) \exp\left(-\frac{VP(t)}{RT_{ref}}\right) \exp(\alpha[R])\left(\frac{W}{C}\right)^n}$$

where W is the amount of water, C is the amount of cement, $TT_0$ is a thickening time of pure Portland cement at a desired temperature when $$\frac{\text{water}}{\text{Portland}} = 1,$$

$E_{eff,TT}$ is an effective activation energy of the cement slurry which describes the sensitivity to temperature changes, R is the gas constant, $T_{ref}$ is a reference temperature where effective activation energy is measured or calculated at, T is temperature, t is time, V is an activation volume, α is a potency of the cement retarder, and n is a constant.

6. The method of claim 5 wherein the cement retarder and mass fraction thereof are selected such that t=the storage time requirement solves the integral equation.

7. The method of claim 5 wherein the storage time requirement is about 1 day to about 30 days.

8. The method of claim 1 wherein the engineering parameters further comprises a thickening time requirement, and wherein the method further comprises selecting an activator and mass fraction thereof based at least in part on an activator thickening time model and the thickening time requirement.

9. The method of claim 8 wherein the activator thickening time model comprises the following integral equation:

$$1 = \int_0^t \frac{(dt)}{TT_0 \exp\left(-\frac{E_{eff,TT}}{R}\left(\frac{1}{T_{ref}} - \frac{1}{T(t)}\right)\right)} \\ \exp\left(-\frac{VP(t)}{RT_{ref}}\right) \exp(\alpha[R(t)])\left(\frac{W}{C}\right)^n \exp(\alpha_a[A(t)])$$

where W is the amount of water, C is the amount of cement, $TT_0$ is a thickening time of pure Portland cement at a desired temperature when $$\frac{\text{water}}{\text{Portland}} = 1,$$

$E_{eff,TT}$ is an effective activation energy of the cement slurry which describes the sensitivity to temperature changes, R is the gas constant, $T_{ref}$ is a reference temperature where effective activation energy is measured or calculated at, T is temperature, t is time, V is an activation volume, α is a potency of the cement retarder, $\alpha_a$ is a potency of the activator, R(t) is a mass fraction of the cement retarder as a function of time, A(t) is a mass fraction of the activator as a function of time, and n is a constant.

10. A method comprising:
   defining engineering parameters of a proposed cement slurry, the engineering parameters comprising at least a compressive strength requirement, a density requirement, a storage time requirement, and a thickening time requirement;
   selecting, based at least in part on a model of compressive strength, a model of storage time which includes an estimated daily high temperature and an estimated daily low temperature, and the density requirement, at least a cement and mass fraction thereof, at least one supplementary cementitious material and mass fraction thereof, and a water and mass fraction thereof, such that a cement slurry formed from the cement, the at least one supplementary cementitious material, and the water meets or exceeds the compressive strength requirement and the density requirement;
   selecting, based at least in part on a model of thickening time, an accelerator and mass fraction thereof;
   selecting, based at least in part on a model of activator thickening time, an activator and mass fraction thereof; and
   preparing a cement slurry comprising the cement and mass fraction thereof, the at least one supplementary cementitious material and mass fraction thereof, the water and mass fraction thereof, and the cement retarder and mass fraction thereof.

11. The method of claim 10 wherein the cement is selected from the group consisting of Portland cements, pozzolana cements, gypsum cements, high alumina content cements, silica cements, and combinations thereof.

12. The method of claim 10 wherein the at least one supplementary cementitious material is selected from the group consisting of fly ash, blast furnace slag, silica fume, pozzolans, kiln dust, clays, and combinations thereof.

13. The method of claim 10 wherein the engineering parameters further comprise temperature and wherein the model of compressive strength comprises the following equation:

$$CS = CS_0 \left( \frac{water}{\sum_i \alpha_i m_i} \right)^n \exp\left( -\frac{E_{eff,TT}}{R} \left( \frac{1}{T_{ref}} - \frac{1}{T} \right) \right)$$

where $CS_0$ is the compressive strength of a Portland cement at a desired temperature when $$\frac{water}{Portland} = 1,$$

water is a mass fraction of water, $\alpha_i$ is a constant that characterizes reactivity of blend material i, $m_i$ is a mass fraction of component i, n is a measure of sensitivity to change in water content, $E_{eff,TT}$ is an effective activation energy, R is the universal gas constant, $T_{ref}$ is a reference temperature where effective activation energy is measured or calculated at, and T is the temperature.

14. The method of claim 13 wherein the selecting at least a cement and mass fraction thereof, at least one supplementary cementitious material and mass fraction thereof, and a water and mass fraction thereof, comprises:
   (a) selecting at least a cement and mass fraction thereof, at least one supplementary cementitious material and mass fraction thereof, and a water and mass fraction thereof;
   (b) calculating a compressive strength of a cement slurry comprising the cement and mass fraction thereof, the at least one supplementary cementitious material and mass fraction thereof, and the water and mass fraction thereof using the model of compressive strength; and
   (c) comparing the compressive strength of the cement slurry to the compressive strength requirement and repeating steps (a)-(c) if the compressive strength does not meet or exceed the required compressive strength.

15. The method of claim 14 wherein the engineering parameters further comprise temperature, and wherein the model of thickening time comprises the following integral equation:

$$1 = \int_0^t \frac{dt}{TT_0 \exp\left( -\frac{E_{eff,TT}}{R} \left( \frac{1}{T_{ref}} - \frac{1}{T(t)} \right) \right) \exp\left( -\frac{VP(t)}{RT_{ref}} \right) \exp(\alpha[R(t)]) \left( \frac{W}{C} \right)^n \exp(\alpha_a[A(t)])}$$

where W is the amount of water, C is the amount of cement, $TT_0$ is a thickening time of pure Portland cement at a desired temperature when $$\frac{water}{Portland} = 1,$$

$E_{eff,TT}$ is an effective activation energy of the cement slurry which describes the sensitivity to temperature changes, R is the gas constant, $T_{ref}$ is a reference temperature where effective activation energy is measured or calculated at, T is temperature, t is time, V is an activation volume, $\alpha$ is a potency of the cement retarder, and n is a constant.

16. The method of claim 15 wherein the cement retarder and mass fraction thereof are selected such that t=the storage time requirement solves the integral equation.

17. The method of claim 15 wherein the storage time requirement is about 1 day to about 30 days.

18. The method of claim 14 wherein the model of activator thickening time comprises the following integral equation:

$$1 = \int_0^L \frac{dt}{TT_0 \exp\left( -\frac{E_{eff,TT}}{R} \left( \frac{1}{T_{ref}} - \frac{1}{T(t)} \right) \right) \exp\left( -\frac{VP(t)}{RT_{ref}} \right) \exp(\alpha[R]) \left( \frac{W}{C} \right)^n}$$

where W is the amount of water, C is the amount of cement, $TT_0$ is a thickening time of pure Portland cement at a desired temperature when $$\frac{water}{Portland} = 1,$$

$E_{eff,TT}$ is an effective activation energy of the cement slurry which describes the sensitivity to temperature changes, R is the gas constant, $T_{ref}$ is a reference temperature where effective activation energy is measured or calculated at, T is temperature, t is time, V is an activation volume, α is a potency of the cement retarder, $α_a$ is a potency of the activator, R(t) is a mass fraction of the cement retarder as a function of time, A(t) is a mass fraction of the activator as a function of time, and n is a constant.

19. The method of claim 18 wherein the activator and mass fraction thereof are selected such that t=the thickening time requirement solves the integral equation.

20. The method of claim 18 further comprising:
   storing the cement slurry for a period of time less than or equal to the required storage time;
   mixing the cement slurry with the accelerator; and
   introducing the cement slurry into a wellbore.

\* \* \* \* \*

UNITED STATES PATENT AND TRADEMARK OFFICE
CERTIFICATE OF CORRECTION

PATENT NO. : 11,447,425 B2
APPLICATION NO. : 16/923864
DATED : September 20, 2022
INVENTOR(S) : John Paul Bir Singh et al.

Page 1 of 1

It is certified that error appears in the above-identified patent and that said Letters Patent is hereby corrected as shown below:

In the Claims

Claim 15 at Column 40, Line 25 please correct the equation:

" $$1 = \int_0^t \frac{dt}{TT_0 \exp\left(-\frac{E_{eff,TT}}{R}\left(\frac{1}{T_{ref}} - \frac{1}{T(t)}\right)\right) \exp\left(-\frac{VP(t)}{RT_{ref}}\right) \exp(\alpha[R(t)]) \left(\frac{W}{C}\right)^n \exp(\alpha_a[A(t)])}$$ "

To recite:

-- $$1 = \int_0^t \frac{dt}{TT_0 \exp\left(-\frac{E_{eff,TT}}{R}\left(\frac{1}{T_{ref}} - \frac{1}{T(t)}\right)\right) \exp\left(-\frac{VP(t)}{RT_{ref}}\right) \exp(\alpha[R]) \left(\frac{W}{C}\right)^n}$$ --.

Claim 18 at Column 40, Line 55 please correct the equation:

" $$1 = \int_0^t \frac{dt}{TT_0 \exp\left(-\frac{E_{eff,TT}}{R}\left(\frac{1}{T_{ref}} - \frac{1}{T(t)}\right)\right) \exp\left(-\frac{VP(t)}{RT_{ref}}\right) \exp(\alpha[R]) \left(\frac{W}{C}\right)^n}$$ "

To recite:

-- $$1 = \int_0^t \frac{dt}{TT_0 \exp\left(-\frac{E_{eff,TT}}{R}\left(\frac{1}{T_{ref}} - \frac{1}{T(t)}\right)\right) \exp\left(-\frac{VP(t)}{RT_{ref}}\right) \exp(\alpha[R(t)]) \left(\frac{W}{C}\right)^n \exp(\alpha_a[A(t)])}$$ --.

Signed and Sealed this
Fifteenth Day of November, 2022

Katherine Kelly Vidal
*Director of the United States Patent and Trademark Office*